June 29, 1943.  R. ANSCHÜTZ ET AL  2,322,997
CONTROLLING MEANS FOR COMBINED TYPEWRITING
AND CALCULATING MACHINES
Filed Sept. 8, 1938    15 Sheets-Sheet 1

R. Anschütz
F. Schmidt
Inventors

June 29, 1943. R. ANSCHÜTZ ET AL 2,322,997
CONTROLLING MEANS FOR COMBINED TYPEWRITING
AND CALCULATING MACHINES
Filed Sept. 8, 1938 15 Sheets-Sheet 4

R. Anschütz
F. Schmidt
Inventors

By Glascock Downing & Seebold
Attys.

June 29, 1943.  R. ANSCHÜTZ ET AL  2,322,997
CONTROLLING MEANS FOR COMBINED TYPEWRITING
AND CALCULATING MACHINES
Filed Sept. 8, 1938   15 Sheets-Sheet 7

R. Anschütz
F. Schmidt
Inventors
By: Glascock Downing & Seebold
Attys.

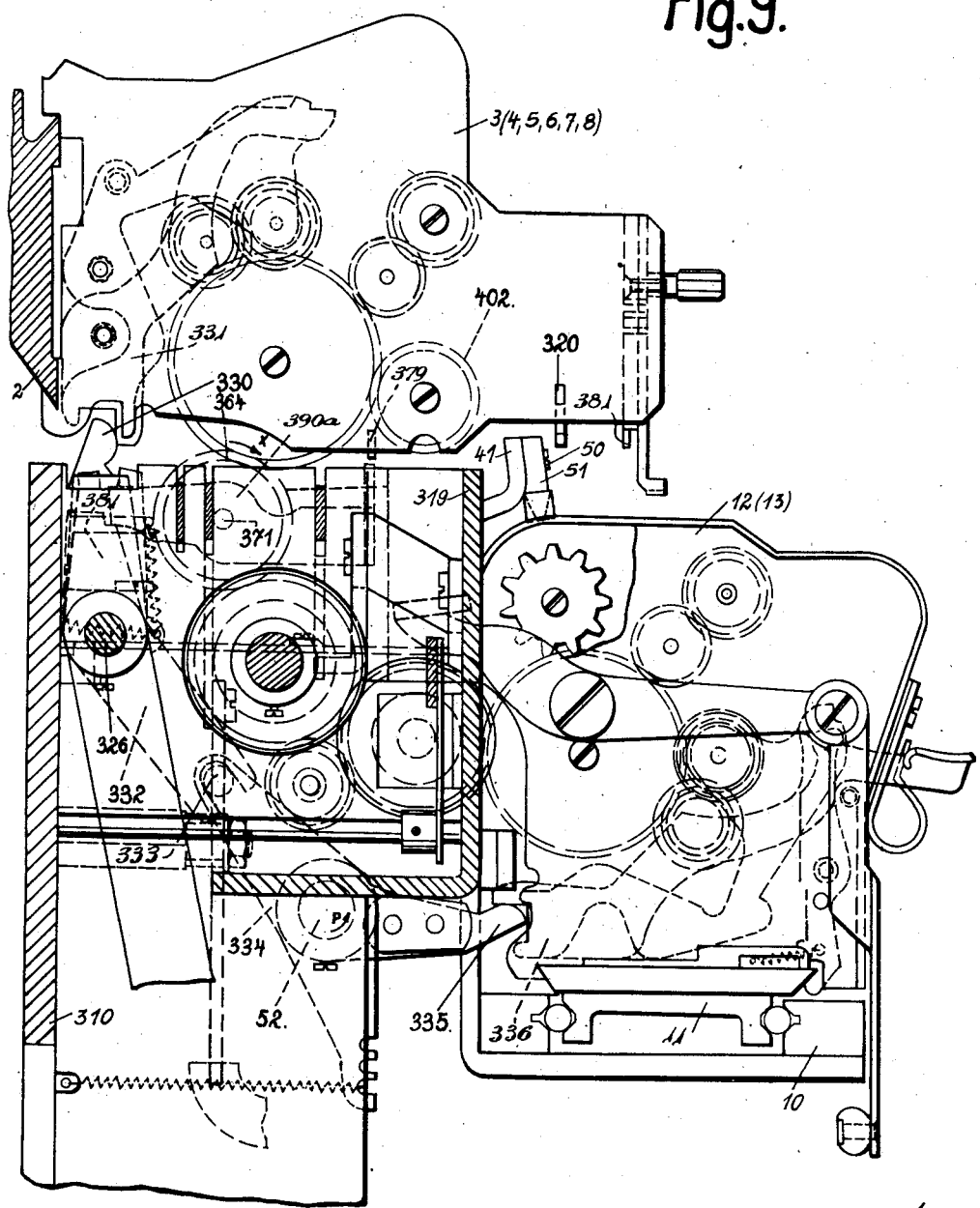

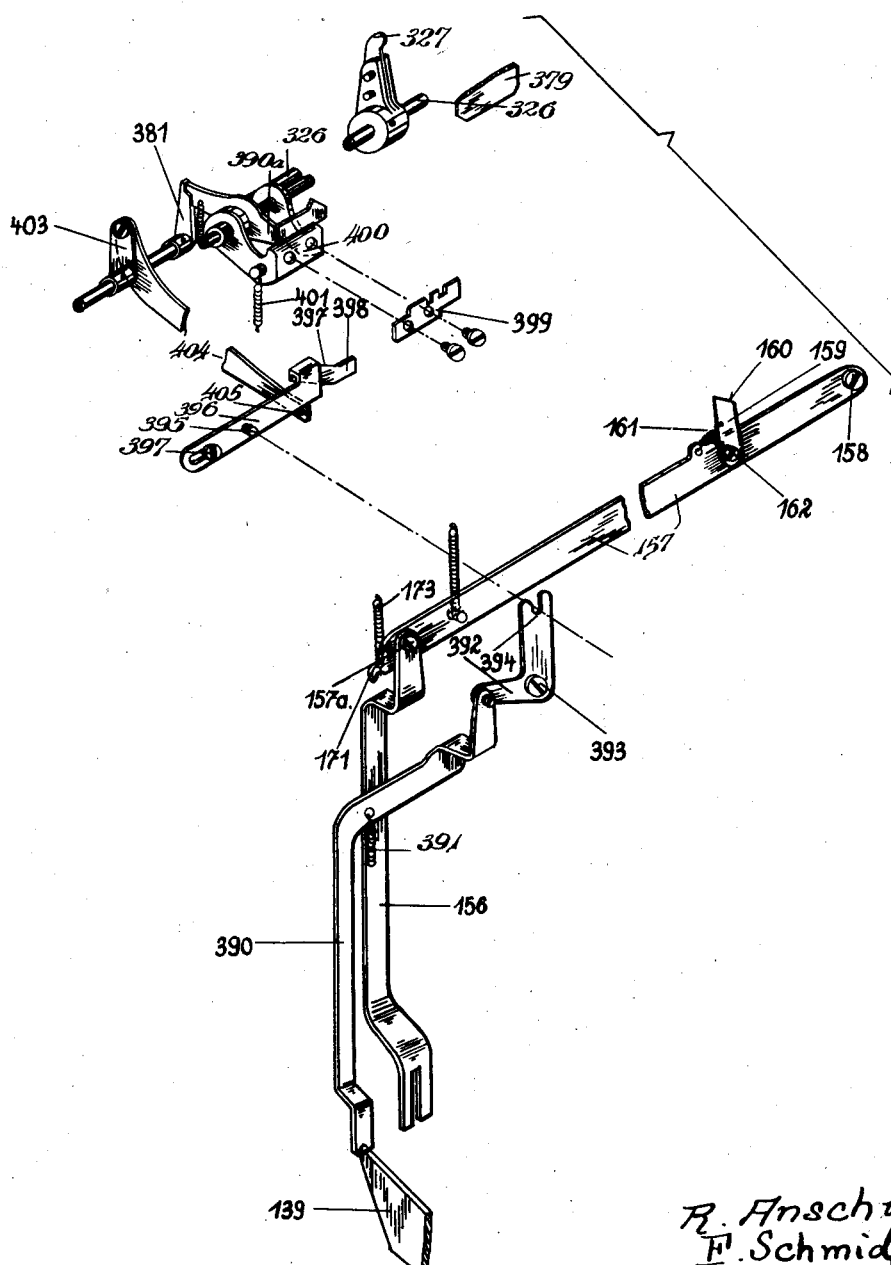

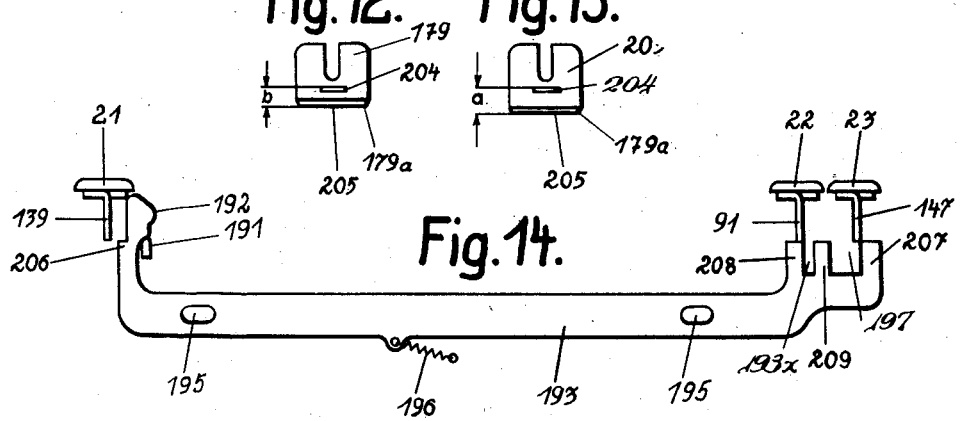
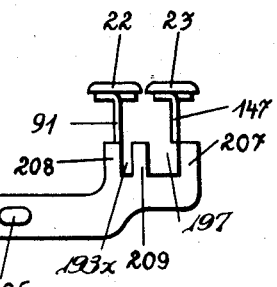
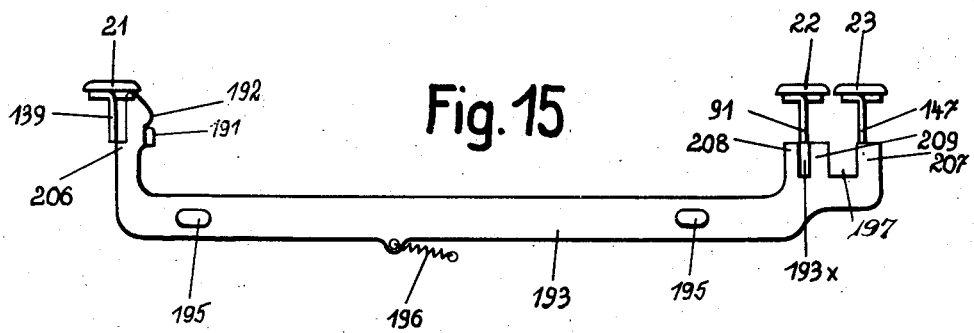
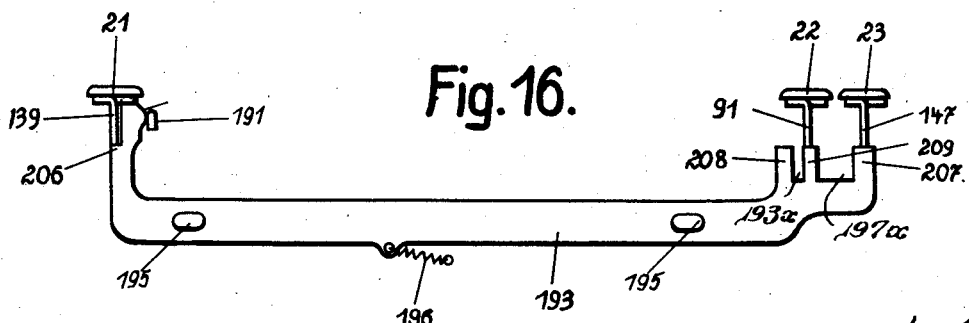

June 29, 1943.  R. ANSCHÜTZ ET AL  2,322,997
CONTROLLING MEANS FOR COMBINED TYPEWRITING
AND CALCULATING MACHINES
Filed Sept. 8, 1938  15 Sheets-Sheet 11

Fig. 17.

| Date. | Stock. Kilo. | Supply Kilo. | Customer I Kilo. | Customer II Kilo. | Delivery Kilo. | Stock. Kilo. |
|---|---|---|---|---|---|---|
| 1.10.37 | 167. | 23. | 12. | 15. | 27. | 163. |
| 2.10.37 | 163. | 37. | 43. | 32. | 75. | 125. |
| | | 60. | 55. | 47. | 102. | |
| I | II | III | IV | V | VI | |

Fig. 21.

R. Anschütz
F. Schmidt
Inventors by Glascock Downing & Seebold
Attys.

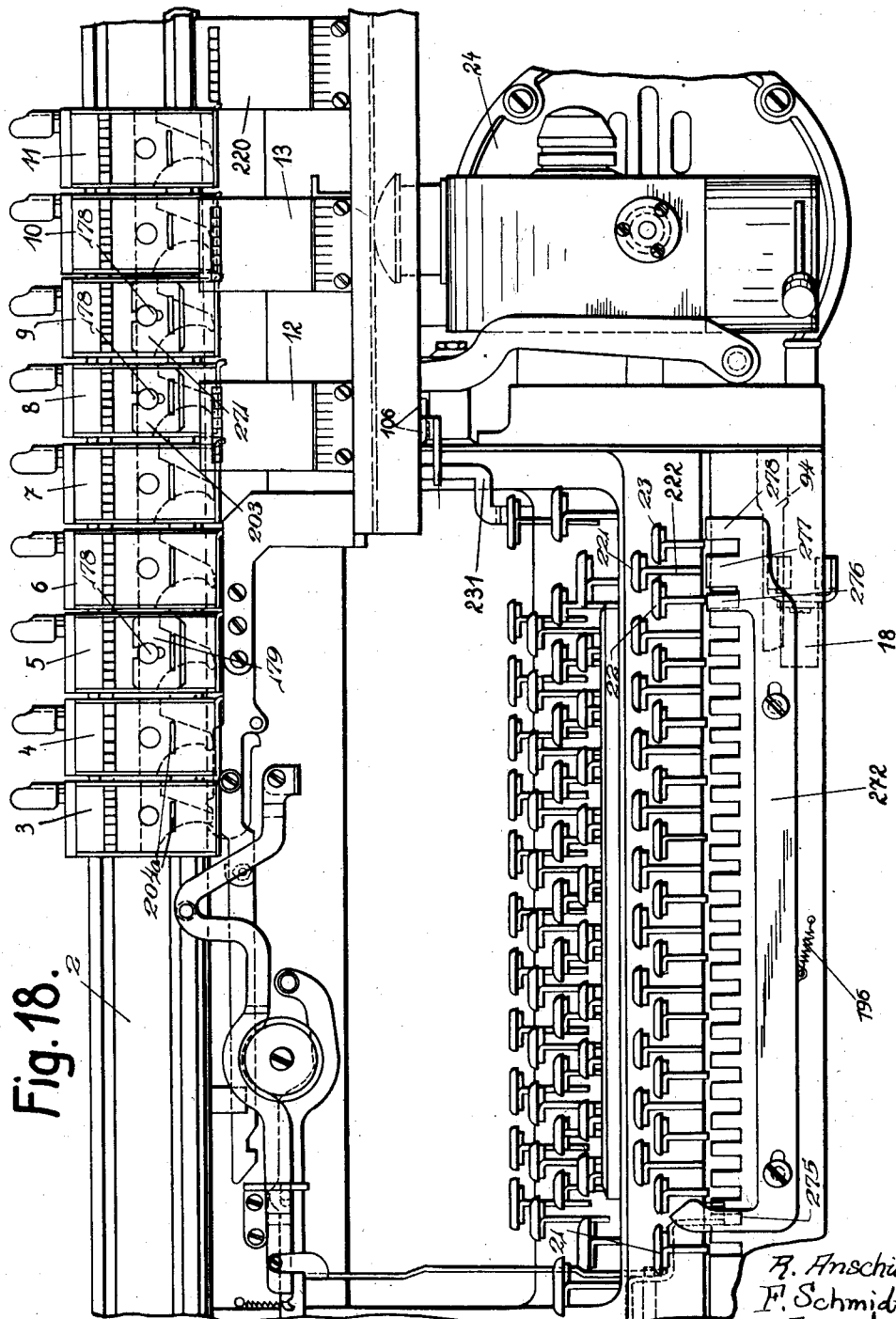

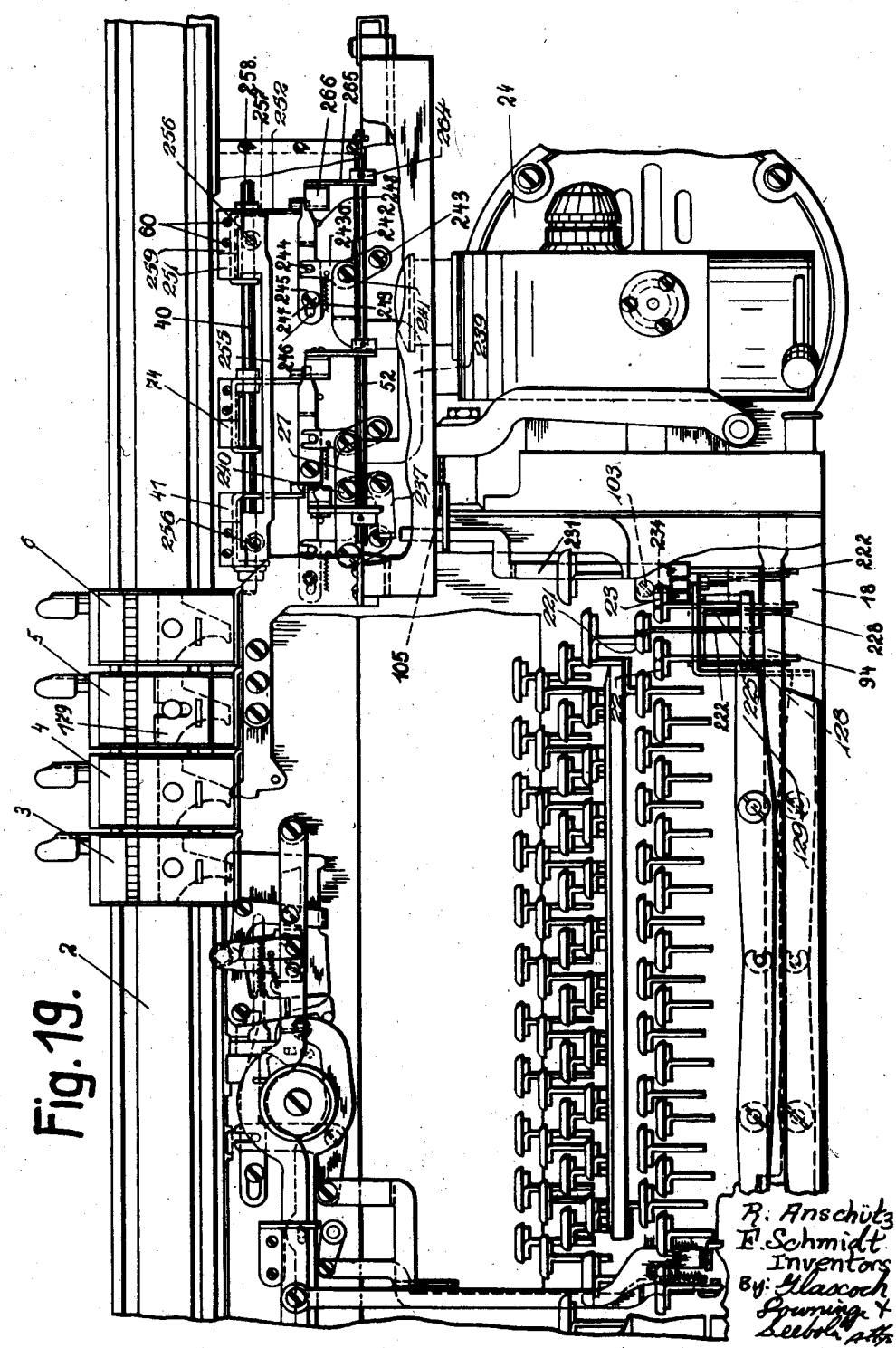

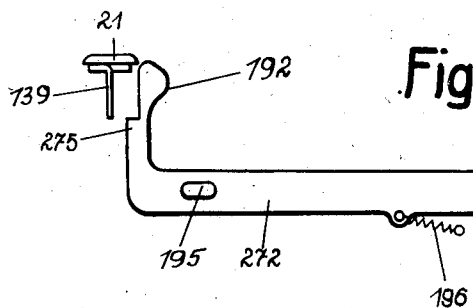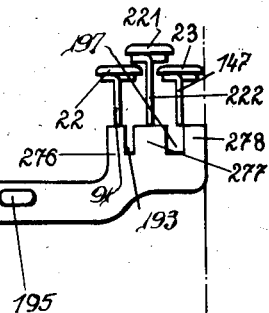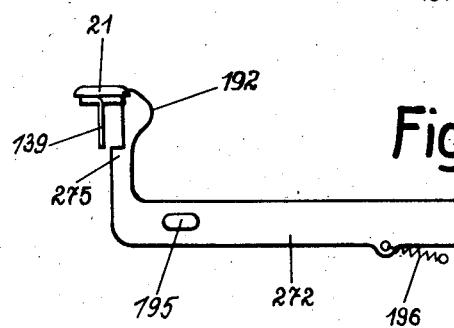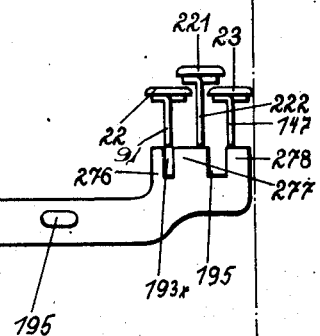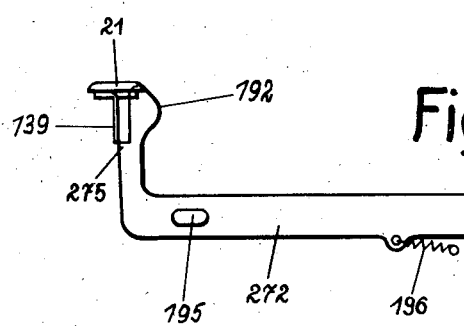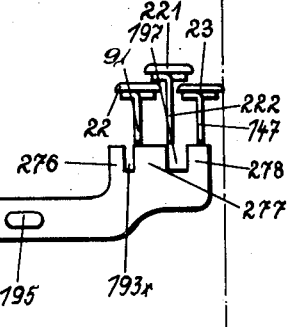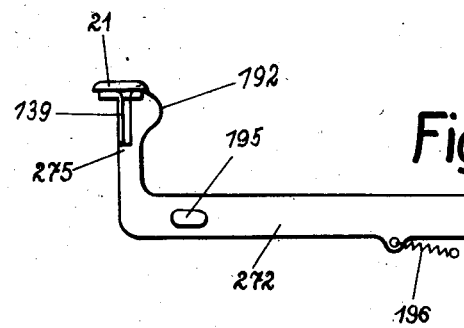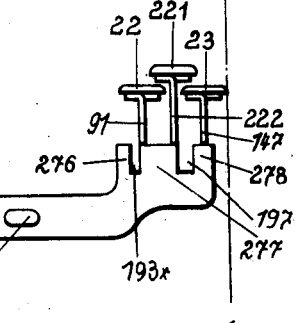

Patented June 29, 1943

2,322,997

UNITED STATES PATENT OFFICE 2,322,997

CONTROLLING MEANS FOR COMBINED TYPEWRITING AND CALCULATING MACHINES

Robert Anschütz and Fritz Schmidt, Zella-Mehlis, Germany; vested in the Alien Property Custodian Application September 8, 1938, Serial No. 229,026
In Germany September 9, 1937

1 Claim. (Cl. 235—59)

This invention relates to means for controlling a total-taking mechanism. In this controlling means, a manually operated member is provided for all column totalizers, with the object of rendering active the zero stop for the total taking from the column totalizers.

In the known machines of this kind, a separate zero stop was provided for each cross totalizer, for the total taking from the cross totalizers, but such zero stops were selected in conformity with the movement of the paper carriage, and were moved into active position by a manually operated member provided for all zero stops. The zero stop in consideration was selected by means of the control plates arranged on the column totalizers. In order to avoid the necessity of arranging extra control plates, the—already present—adjustable control plate for the species of calculation to be performed in the corresponding cross totalizer, was employed for selecting the zero stop in consideration. This way of control, however, was possible only for complementary totalizers, the control plate which had been adjusted for subtraction, selecting one of the zero stops when a positive value is withdrawn, and the control plate which had been adjusted for addition, selecting the other zero stop when a negative value is withdrawn. Selection is effected by a rocking device which is permanently in operative connection with the manually operated member aforesaid.

When, however, it was desired to take a total from several normal cross totalizers in which the sequence of the figures is not opposite, as in complementary totalizers, but is the same, it was only possible to select a definite zero stop, because the control plate provided for each cross totalizer on the column totalizers was at subtraction and so a selective movement while the carriage traveled from column totalizer to the other, was impossible.

It has been proposed to eliminate this drawback by connecting to each other the zero stops of the individual cross totalizers.

This, however, involved the drawback that when the total of a value was taken from one of the cross totalizers, this same value could not be subtracted simultaneously from the other cross totalizers, or one of the other totalizers, because the zero-setting tooth of each cross totalizer was in active position, and did not permit the setting to zero of that cross totalizer which it was desired to set to zero.

All these drawbacks are eliminated according to the present invention by allotting to each cross totalizer, in manner per se known, a separate zero stop which is selected, and moved into active position, by a separate manually operated member allotted to each zero stop.

By these means, it is no longer necessary to provide an arrangement of the zero stops in complementary totalizers which is different from that in normal cross totalizers, and so the manufacture of the zero stops can be standardised and the cost reduced, and the selection and operation of the zero stops are rendered reliable.

In the accompanying drawings, several constructional embodiments of the invention are illustrated by way of example. The several embodiments have been illustrated as adapted to a typewriting calculating machine but it is understood that the invention is not limited to this, and may be adapted to any other suitable machine.

In the drawings

Figs. 1 to 12 illustrate a typewriting-calculating machine with two cross totalizers.

Fig. 1 is a front elevation of the machine which is equipped with the mechanism according to the invention. Several members having no direct bearing on the invention have been omitted and the only part of the paper carriage which has been shown in the suspension rail, with the column totalizers.

Fig. 2 is a similar front elevation, with parts broken away and the cross totalizers and some of the column totalizers being omitted.

Fig. 3 is a perspective illustration, viewed from the left and the front of the machine and showing the automatic mechanism for total taking from the column and cross totalizers.

Fig. 4 is a perspective illustration of parts effecting the automatic total taking from the cross totalizers, several parts being shown at a distance from each other for the sake of clearness.

Fig. 5 shows a perspective illustration of parts driving the cross-footers, whereby some of the parts are represented drawn out from one another.

Fig. 6 shows a perspective illustration of the unlocking lever and the zero-setting lever with other parts co-acting with said levers seen from the front left hand side.

Fig. 7 shows a side elevation of the unlocking and zero-settings mechanisms shown in Fig. 6.

Fig. 8 shows a front elevation of the parts illustrated in Fig. 6.

Fig. 9 shows a section through the casing of the differential mechanism in which are also illustrated the totalizers and cross footers.

Fig. 10 shows a perspective illustration of different controlling parts of the differential mechanism for automatic total taking from the totalizers, whereby for a better understanding several parts are represented drawn out from one another or are shown broken away.

Fig. 11 is a perspective illustration, viewed from the right and the front of the machine, of a carriage-controlled mechanism for locking the two-cross-totalizer total-taking keys.

Fig. 12 is an elevation of an angular unlocking member arranged to be secured to a column totalizer.

Fig. 13 is an elevation of the unlocking member for the modified locking bar illustrated in three distinct positions in Figs. 14, 15 and 16. This locking bar is designed for locking the two-cross-totalizer total-taking keys and the column-totalizer total-taking key.

Fig. 14 shows that position of the locking bar in which the cross-totalizer total-taking key at the left is locked, and the column-totalizer total-taking key and the cross-totalizer total-taking key at the right are free.

Fig. 15 shows that position of the locking bar in which the cross-totalizer total-taking key at the right is locked, and the column-totalizer total-taking key and the cross-totalizer total key at the left are free.

Fig. 16 shows that position of the locking bar in which both cross-totalizer total-taking keys, and the column-totalizer total-taking key are locked.

Fig. 17 shows a part of a form to be filled in by the machine.

Figs. 18 to 25, inclusive, illustrate a typewriting calculating machine having three cross totalizers instead of two.

Figure 1:
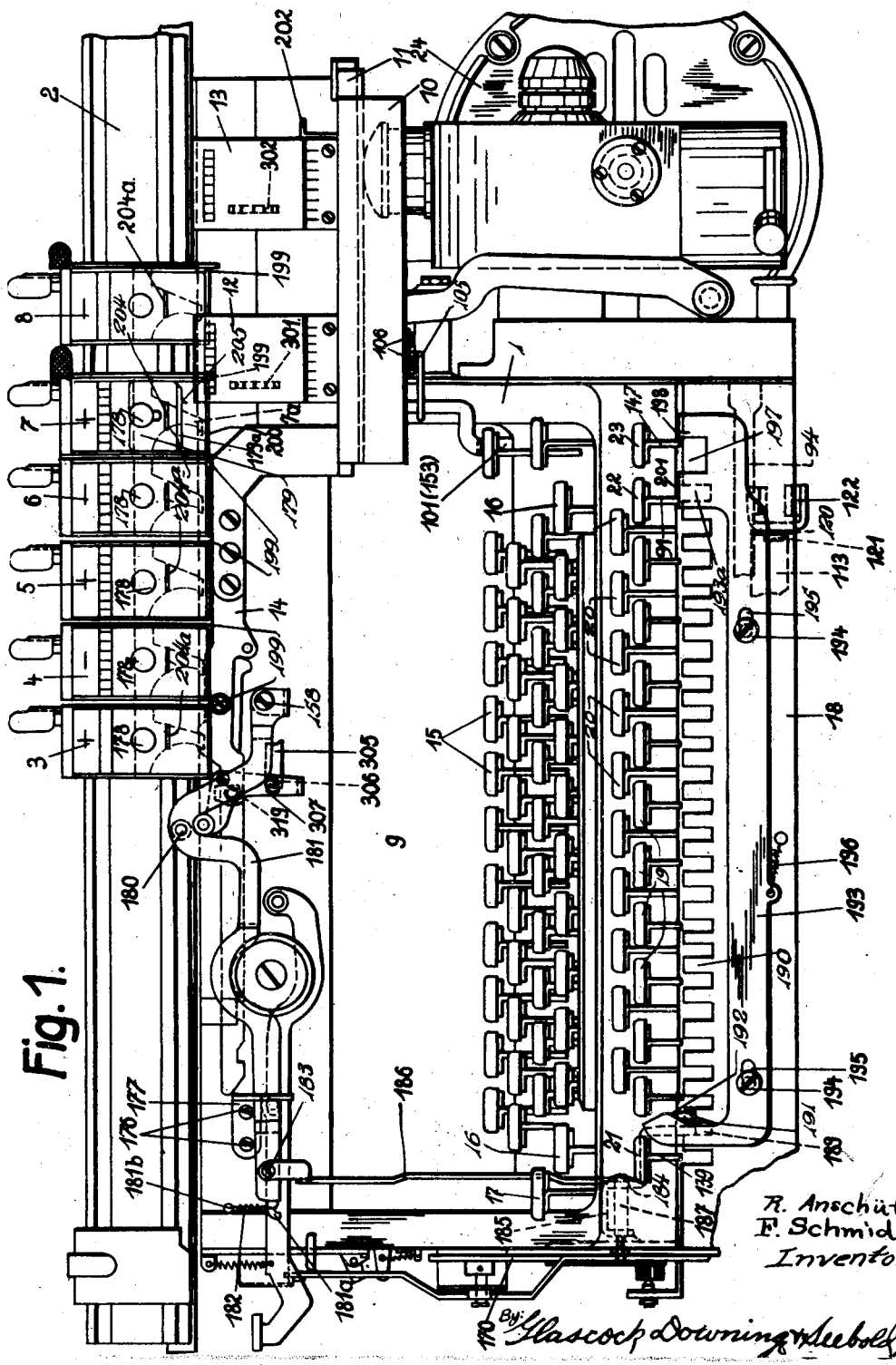

Fig. 18 is a front elevation of the machine in which, as in Fig. 1, certain parts have been omitted.

Figure 2:
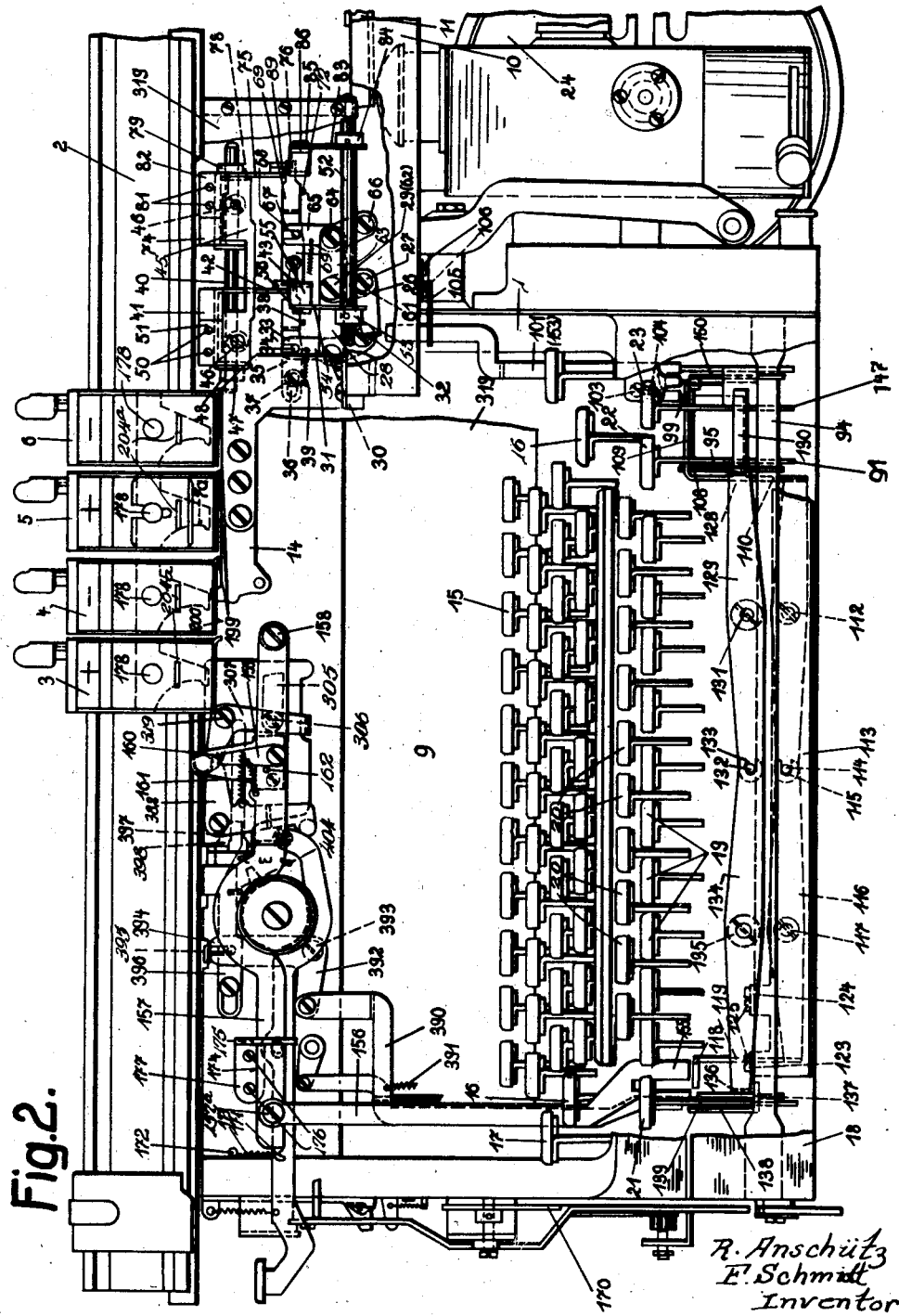

Fig. 19 is a similar front elevation in which, as in Fig. 2, parts are broken away, and the column totalizers are omitted.

Figure 3:
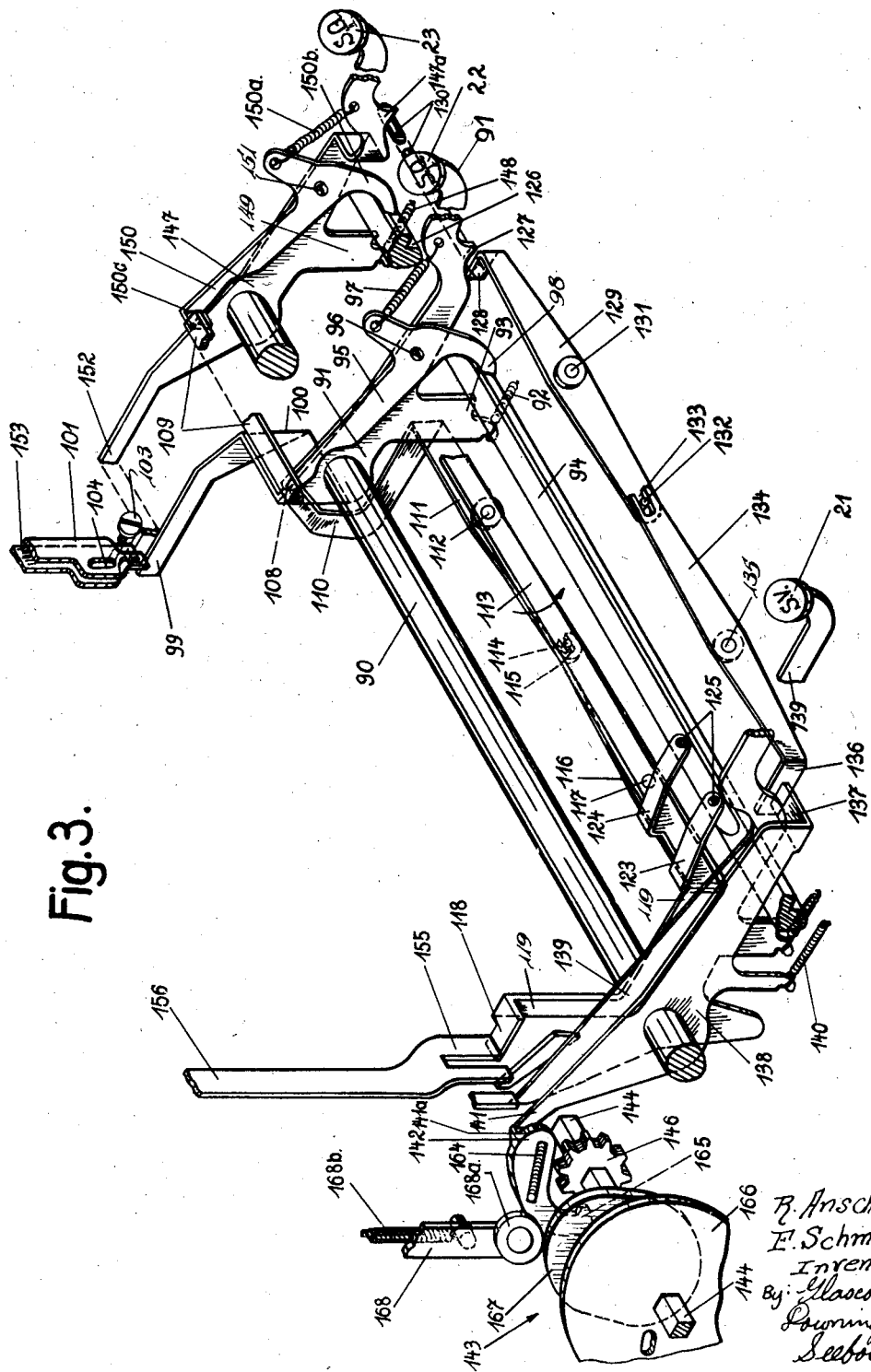
Figure 20:
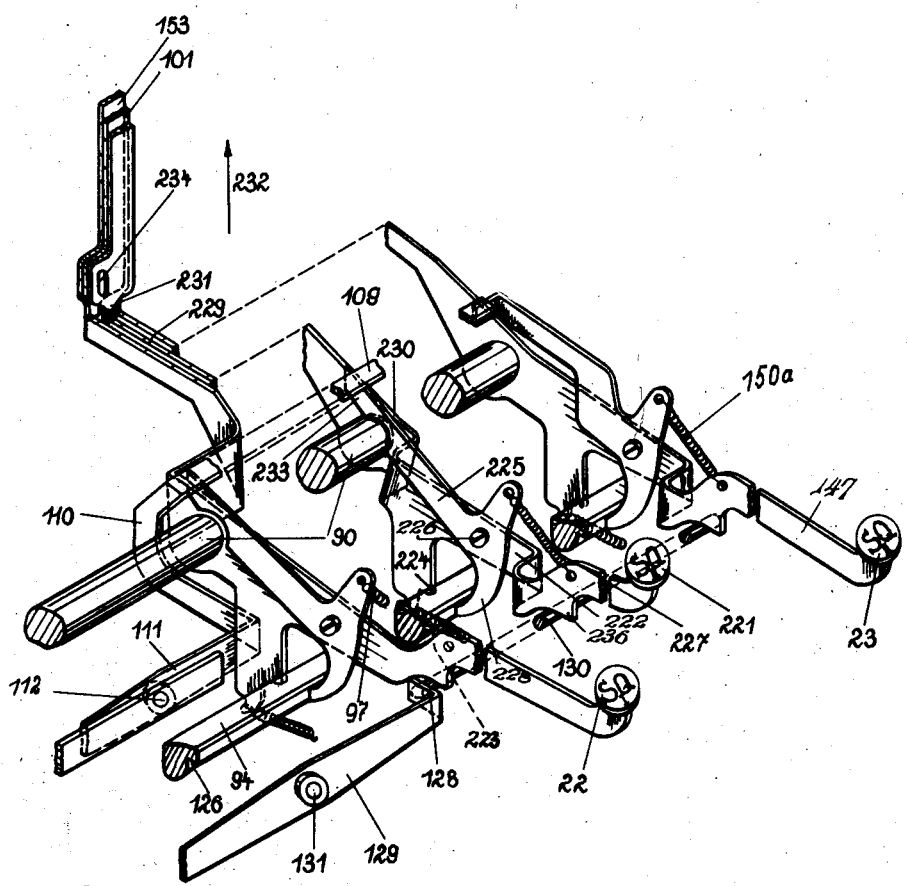

Fig. 20 is a perspective illustration, viewed from the left and the front of the machine and showing, like Fig. 3, the automatic mechanism for total taking from the cross totalizers, several parts being broken away and the broken-away portions being shown at a distance from the body of the corresponding parts, to expose other members.

Figure 4:
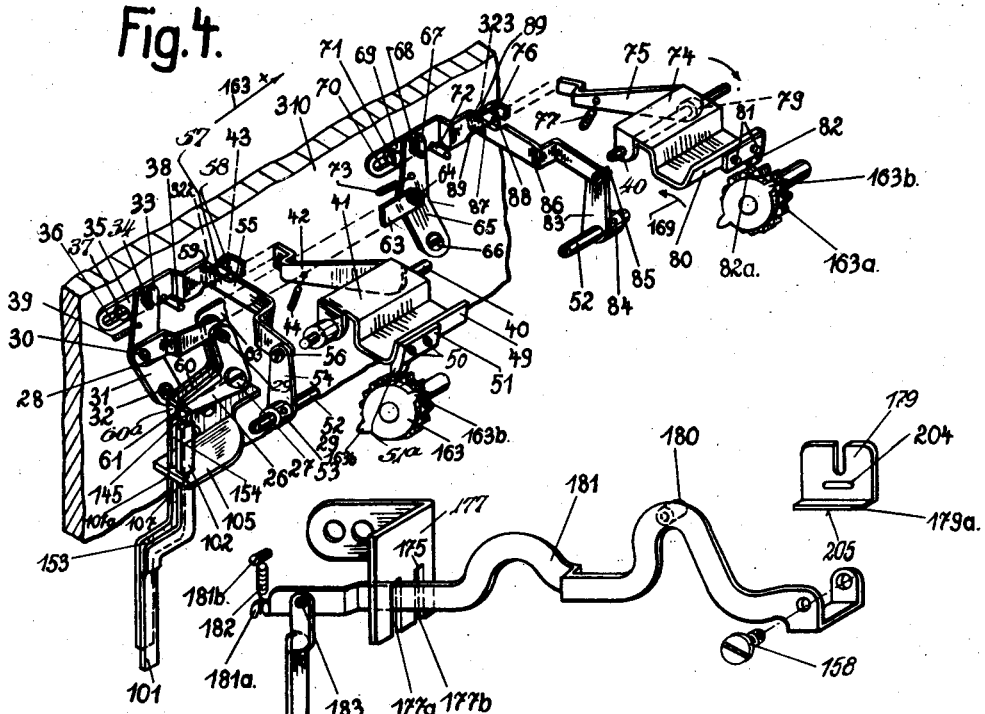

Fig. 21 is a perspective illustration of other parts effecting the total taking from the cross totalizers, several parts being shown at a distance from each other, as in Fig. 4.

Figs. 22 to 25, inclusive, illustrate the locking bar of this machine, for locking its three cross-totalizer total-taking keys and its column totalizers total taking key, in four distinct positions.

Fig. 22 shows that position of the locking bar in which the left-hand and central cross-totalizer total-taking keys are locked and the column-totalizer total-taking key and the right-hand cross-totalizer total-taking key are free.

Fig. 23 shows that position of the locking bar in which the central and the right-hand cross-totalizer total-taking keys are locked and the column-totalizer total-taking key and the left-hand cross-totalizer total-taking key are free.

Fig. 24 shows that position of the locking bar in which the left-hand and right-hand cross-totalizer total-taking keys are locked, and the column-totalizer key and the central cross-totalizer total-taking key are free.

Fig. 25 shows that position of the locking bar in which the three cross-totalizer total-taking keys and the column-totalizer key are locked.

General description of the machine

The machine, in its fundamental features, comprises a machine frame 1 (Figs. 1 and 2) supporting the typewriting mechanism and the paper carriage, not shown. Column totalizers designated by the numerals 3 to 8, inclusive, are arranged on a totalizer suspension rail 2 (Fig. 1) which is secured to the paper carriage. The column totalizers 3 and 8 may be dummies, since an addition of the amounts in columns I and VI of the form 25 (Fig. 17) is not required.

A calculating mechanism case, carrying a calculating mechanism is indicated generally by the numeral "9" and secured at the front side of the machine frame 1.

At the right-hand front side of the machine, a table 10 is secured to the calculating mechanism case 9 and a slide 11 is mounted to reciprocate longitudinally in the table. Cross totalizers 12 and 13 are adjustably mounted on the table. During the operation of the machine, the cross totalizers 12 and 13 are moved by that column totalizer which is in active position at the time, by a connecting rod 14 whose vertical right-hand end is attached to the slide 11.

Arranged in the frame of the machine is a typewriting keyboard 15, with a pair of changing-over keys 16 and a carriage-return key 17.

A bearing frame 18 on the machine frame 1 supports a calculating keyboard 19, a decimal tabulator keyboard 20, and the manually operated total taking keys referred to in the introduction. The manually operated member for all column totalizers is the column-totalizer total-taking key 21 whose key bar 139 is mounted to swing about a rod 90 (Fig. 3) secured in the bearing frame 18. The manually operated members for controlling the zero stops of the cross totalizers, are the cross-totalizer total-taking keys 22 and 23 which are allotted to the cross totalizers 12 and 13, respectively, with their respective key bars 91 and 141 also mounted to swing about the rod 90.

A motor 24 secured to the right-hand side of the machine frame 1 operates the drive of the machine.

The filling-in of the form

The form 25 (Fig. 17) has six vertical columns, numbered I to VI, and on it is entered a record showing the conditions in a magazine on the first and second days of October, 1937. As shown in the first line of the form, and column I, the magazine had in stock 167 kg. of any material when it was opened on the first October. 23 kg. were supplied to the magazine, as noted in column II, and two customers, Messrs. I and II, bought 12 and 15 kg., respectively, columns III and IV. The total delivery being 27 kg., column V, it had in stock 163 kg. as noted in column VI, at the close of the first October. A similar record was kept for the second October, showing a balance of 125 kg. in stock, column VI, and the values in columns II, III, IV and V were added.

The values to be booked in columns I and II of the form 25, being "167" and "23" in the present instance on the first October, are introduced additively and added at the same time in the cross totalizer 13, making "190." The values in column II are added in the column totalizer 4. The values "12" and "15" which are to be entered in columns III and IV, respectively, are introduced additively in the column totalizers 5 and 6, and added in the cross totalizer 12, making "27." The value "27" is now to be withdrawn from the cross totalizer 12 and at the same time to be subtracted from the value "190" in the cross totalizer 13, and at the same time to be introduced in the column totalizer 7. This operation is performed automatically upon depression of the total-taking key 22 allotted to the cross totalizer 12. Due to the clear writing in the cross totalizer 12, the value "163" remains in the cross totalizer 13. This value is to be written clear from the cross totalizer 13 by depressing the total taking key 23. As it is not desired to add the values in column VI, the column totalizer 8 is a dummy.

*Driving of the cross-footers 12, 13*

Figure 5:
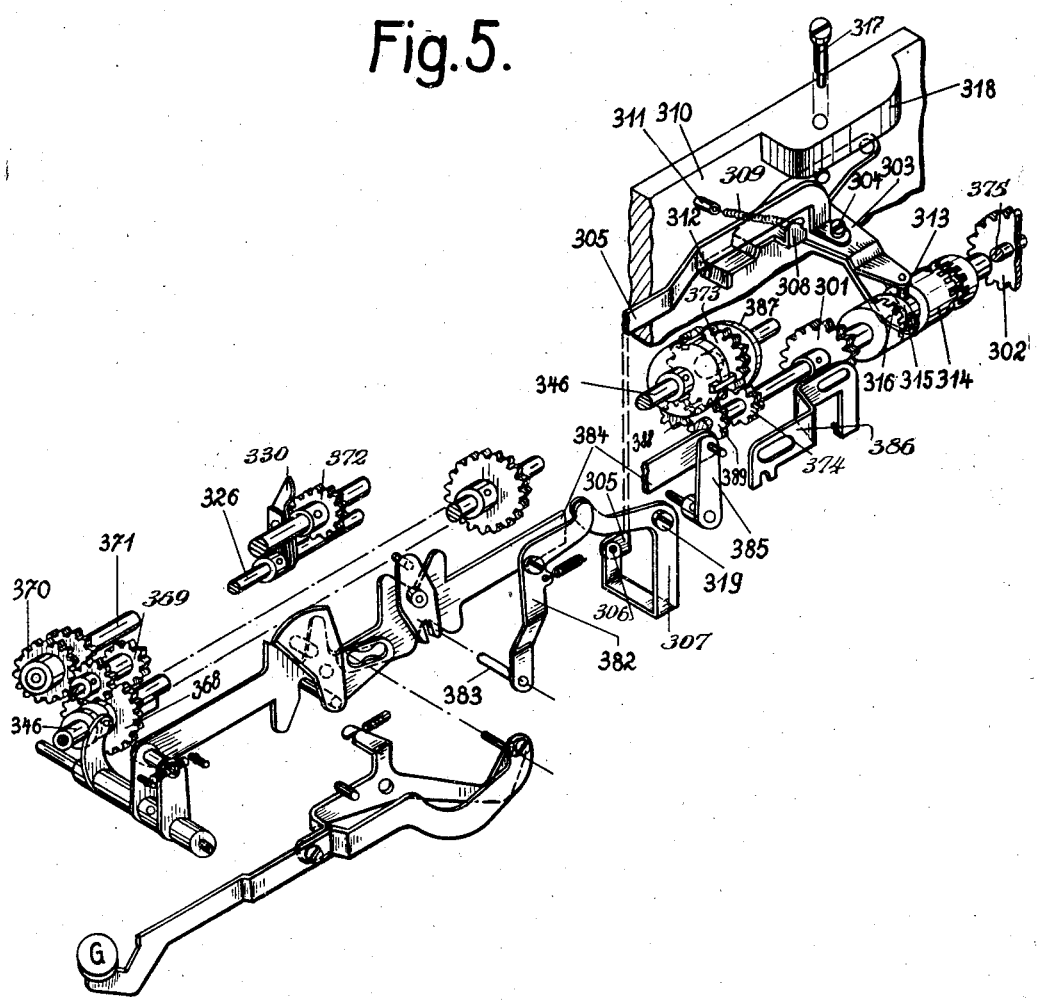

On a coupling lever 303 is pivoted by means of a screw 304 a bent bar 305, which on its other end is pivotally connected by means of a screw 306 (Figs. 1, 2 and 5) with a U-shaped arm of the control lever 307, which is fulcrumed upon the screw 319. The coupling lever 303 is rotatably mounted by means of a screw 317 on an extension 318 of the rear wall 310 of the casing 9 of the differential mechanism. A spring 309 is attached on a hook 308 of the coupling lever 303 and the free end of said spring 309 is held in an eye 311 (Fig. 5) which is arranged in the rear wall 310 of the casing of the differential mechanism. Under the influence of the spring 309 the coupling lever 303 is rocked in the clockwise direction so that the tail 312 of the coupling lever normally contacts the rear wall 310 of the casing of the differential mechanism. The pin 313 of the coupling lever 303, engaged with the coupling sleeve 314 (Fig. 5), normally meshes the teeth 315 of the coupling sleeve with the coupling teeth 316 of the master wheel 301 for the cross totalizer 12. The cam-controlled lever 307 (Figs. 1, 2 and 3) may be rocked counter-clockwise by the control plates 320 (Fig. 9) which are provided in the corresponding column totalizers, so that the master wheels 301, 302 for the cross-footers 12 and 13 may be selected for operation.

*The zero stop mechanisms for the cross totalizer 12*

A bellcrank 26 (Figs. 2 and 4) is mounted to swing about a headed screw 27 which is secured in the rear wall 310 of the casing 9 of the calculating mechanism. One arm of the bellcrank extends upwardly, and a rod 28 is pivoted to the arm by a screw 29. The other end of the rod is pivotally connected to an arm 31 by a headed screw 30. The arm 31 is mounted to swing about a headed screw 32 inserted in the rear wall 310 of the casing 9 of the calculating mechanism and engages a pin 34 on a slide 35 with its upper forked end 33. The slide 35 is mounted to reciprocate longitudinally on the rear wall 310 of the casing 9 of the calculating mechanism by means of a slot 36 and a headed screw 37 projecting through the slot. As another guiding means for the slide 35, a pin 38 is secured in the rear wall 310 of the casing 9 of the calculating mechanism and supports the slide. A spring 39 engaging the arm 31 tends to turn it anticlockwise about its headed screw 32 and to shift the slide 35 to the left. This movement is limited and the initial position of the parts 35, 31 and the members 28, 26 connected thereto is defined by the right-hand end of the slot 36 bearing against the screw 37.

A zero setting flap 41 is mounted to swing about a rod 40 above the slide 35, but is held against displacement in longitudinal direction. A depending arm 42 extends to the rear from the flap 41 and the rear end of this arm extends over the end 43 of the slide 35 under the pull of a spring 44 engaging the arm 42. By these means, the arm 42 is permanently held against the end 43 of the slide 35, and the slide 35 is held against its guiding pin 38.

The rod 40 is supported by a U-shaped bracket 45 (Fig. 2) which is secured to the inner side of the front wall 319 of the casing 9 of the calculating mechanism, this wall being shown broken away at the right, by screws 46. The flap 41 is held against axial displacement on the rod 40 between a deflection 47 of the bracket 45 and an adjusting ring 48.

A zero stop 51 (Fig. 4) is secured on the upwardly deflected front portion 49 of the flap 41 by screws 50, the tooth 51a of the zero stop cooperating with the zero setting wheels 163 of the cross totalizer 12.

A shaft 52 (Figs. 2, 4 and 9) is arranged below, and in front of, the rod 40 in the casing 9 of the calculating mechanism. Keyed on this shaft is the boss 53 of a one-armed lever 54 to which a rod 55 is pivoted by a screw 56. The rod engages below the slide 35 with its end 57, and an incline 58 on the rod 55 is adapted to engage below the slide 35. The end 57 of the slide rod 55 is guided in, are supported by, a suitable slot 322 (Fig. 4) in the rear wall 310 of the casing 9 of the calculating mechanism. A similar incline 59 for cooperation with the arm 42 of the flap 41 is made on the slide 35.

*The zero stop mechanism for the cross totalizer 13*

A second bellcrank 60 which is similar to the bellcrank 26 above described is mounted to swing about the headed screw 27 in the casing 9 of the calculating mechanism. A distance arbor 61 is placed on the screw 27 between the two bellcranks. One arm of the bellcrank 60 extends upwardly, and a rod 63 is pivoted to the arm by a screw 62 (Fig. 2). The other end of the rod is pivotally connected to an arm 65 (Figs. 2 and 4) by a headed screw 64. The arm 65 is mounted to swing about a headed screw 66 inserted in the rear wall 310 of the casing 9 of the calculating mechanism and engages a pin 68 on a slide 69 with its upper forked end 67. The slide 69 is mounted to reciprocate longitudinally on the rear wall 310 of the casing 9 of the calculating mechanism by means of a slot 70 and a headed screw 71 projecting through the slot. As another guiding means for the slide 69 a pin 72 is secured in the rear wall 310 of the casing 9 of the calculating mechanism to support the slide. A spring 73 engaging the arm 65 tends to turn it anticlockwise about its headed screw 66 to shift the slide 69 to the left. This movement is limited and the initial position of the parts and the members connected thereto is defined by the right-hand end of the slot 70 bearing against the headed screw 71.

Another zero setting flap 74 is mounted to swing about the rod 40 above the slide 69, but is held against displacement in longitudinal direction. A depending arm 75 extends to the rear from the flap 74, the free end of which arm extends over the end 76 of the slide 69 under the pull of a spring 77 engaging the arm 75. By these means, the arm 75 is permanently held against the end 76 of the slide 69, and the slide 69 is held against its guiding pin 72. The flap 74 is held against displacement on the rod 40 between a deflection 78 (Fig. 2) of the bracket 45 and an adjusting ring 79.

A zero stop 82 is secured to the upwardly deflected front portion 80 of the flap 74 by screws 81 (Fig. 4) whose tooth 82a cooperates with the zero setting wheels 163a of the cross totalizer 13.

On the shaft 52, the boss 84 of another one-armed lever 83 is keyed to which a rod 86 is pivoted by a screw 85. The rod engages below the slide 69 with its end 87, and an incline 88 on the rod 86 is adapted to engage below the slide 69. The rod 86 is guided in, and supported by, a suitable slot 323 (Fig. 4). A similar incline 89 on the slide 69 cooperates with the arm 75 of the flap 74.

*The preparation total taking from the cross totalizer 12 by depression of the total-taking key 22*

The two total-taking key bars 91 and 147 of the cross-totalizer total-taking keys 22 and 23, respectively, are mounted at the right-hand side of the machine on the rod 90 (Fig. 3) which is secured in the bearing frame 18. They are free to swing about the rod 90 but held against lateral displacement. The total-taking key bar 91, with its key 22, is allotted to the cross totalizer 12, and the total-taking key bar 147, with its key 23, is allotted to the other cross totalizer 13. A locking bar 94 is arranged in the bearing frame 18 below the rod 90. The total-taking key bar 91 for taking totals from the cross totalizer 12, which is provided with the key 22, has a projection 93 which a spring 92 pulls against the rear side of the locking bar 94. A locking lever 95 is pivoted on the left-hand side of the key bar 91 about a screw 96 which holds the locking lever against lateral displacement. The locking lever has an extension 98 which a spring 97 connecting the lever to the bar as a yielding connection, holds against the front side of the locking bar 94, thus defining the initial position of the locking lever 95.

When the total-taking key 22 is depressed, its key bar 91 swings clockwise about the rod 90. The key bar 91 is offset at 100 and its tail end 99 engages the lower end of a push rod 101 (Figs. 2–4), to shift the rod in upward direction. The upper end 102 of the push rod 101 engages the horizontal arm of the bellcrank 26 and turns the bell crank clockwise. Through the mechanism described, the tooth 51a on the zero stop 51 of the flap 41 is moved towards the path of the zero setting teeth 163b of the zero setting wheel 163 in the cross totalizer 12.

At its lower end, the push rod 101 is guided by a screw 103 (Fig. 2) which extends through a slot 104 in the lower end of the rod and is secured in the frame of the machine, limiting, at the same time, the descent of the rod by gravity and defining its initial position. With its upper end, the push rod 101 slides in a slot 107 in an angular guide 105 (Figs. 1, 2 and 4) which is secured to the casing 9 of the calculating mechanism by screws 106.

When the key bar 91 turns about the rod 90 clockwise upon depression of its key 22, the tail end 108 of its locking lever 95 engages below the tail end 109 of the crooked extension 110 at the outer end of a double-armed lever 111. The lever 111 is fulcrumed on a bridge 113 (Figs. 2 and 3) by a headed screw 112. At its inner end, the double-armed lever is equipped with a pin 114 engaging in a slot 115 in the inner end of another double-armed lever 116 which is also fulcrumed on the bridge 113 by a headed screw 117. This lever 116 also has a crooked extension 119, with a tongue 118 at its upper end, for cooperation with the lower end of a forked link 156, as will be described below in the section "Operation upon depression of the cross totalizer total-taking key 22."

At its right-hand end, the bearing bridge 113, as shown in dotted lines in Fig. 1, is equipped with a lug 120, which is secured to an angular bracket 122 on the bearing frame 18 by screws 121. At its left-hand end, the bridge is provided with a pair of arms 123 and 124 (Figs. 2 and 3) whose outer ends are secured to the locking bar 94 by screws 125.

The locking lever 95 partakes in the swinging movement of the total key bar 91 and therefore the lower end of its extension 98 engages in a groove 126 (Fig. 3, at the right) in the locking bar 94 under the action of the spring 97, holding the locking lever 95 and the total-taking key bar 91 in depressed position.

The total-taking key bar 91 while being depressed engages, with a shoulder 127 on its lower edge, a pin 130 which is riveted into the outer end of a double-armed lever 129. This lever 129 is mounted to swing about a headed screw 131 (Figs. 2 and 3) at the inner side of the front transverse rib of the bearing frame 18. A pin 132 at the inner end of the double-armed lever 129 engages in a slot 133 in the inner end of another double-armed lever 134 which is also mounted to swing at the inner side of the rib, and is fulcrumed about a headed screw 135. At its outer end, the lever 134 is bent at right angles to form a lug 136 which is arranged to engage a plate 137 at the front end of a double-armed lever 138. The lever 138 is mounted to swing about the rod 90 at the left of the total key bar 139 to which the column-totalizer total-taking key 21 is secured, for total taking from the column totalizers 4 to 7, inclusive. The total key bar 139 is also mounted to swing on the rod 90. A spring 140 tends to turn the clutch control lever 138 about the rod 90 in anti-clockwise direction so that its tail end 141 engages a coupling member 142. This coupling member controls the connection and disconnection of a coupling element 143 including a cam 166 and a cam 167, with respect to a continuously rotating drive shaft 144. A pinion 146 is keyed on the drive shaft 144 and the coupling member 142 is equipped with a tooth 165 at one end for engaging between the teeth of the pinion 146. A spring 164 tends to engage the tooth 165 with the pinion 146 and to connect the coupling element to the shaft 144 but is prevented from doing so while the tail 141 of the clutch control lever 138 engages the coupling member 142.

When the total-taking key 22 for the cross totalizer 12 is depressed, and its key bar 91 turns clockwise against the action of its spring 92 about the rod 90, the locking lever 95 partakes in this swinging movement under the action of the spring 97. The extension 98 of the locking lever 95 now slides down the front side of the locking bar 94 until the spring 97 pulls the end of the extension into the groove 126 in the locking bar 94 at the end of the swinging movement. The total-taking key bar 91 and its locking lever are held in depressed position in this manner. As the locking lever 95 rocks into locked position its rear end 108 rocks the lateral extension 109 of the double-armed lever 111.

The tail end 99 of the total-taking key bar 91 shifts the push rod 101 in upward direction, and the upper end 102 of the rod 101 (Fig. 4), strikes a lug 145 at the free end of the horizontal bellcrank arm 26. The bellcrank is now turned clockwise and the mechanism to which it is connected is operated, as described in section "The zero setting mechanism for the cross totalizer 12."

The shoulder 127 (Fig. 3) of the depressed total taking key bar 91 acts on the pin 130 at the outer end of the double armed lever 129 and turns the lever clockwise about its fulcrum screw 131. This causes the other lever 134 to be turned anticlockwise by the pin 132 about its fulcrum screw 135. Its lug 136 engages the plate 137 of the clutch control lever 138 and turns it clockwise about the rod 90 against the spring 140. The tail end 141 of the clutch control lever 138 now releases the coupling member 142 so that its tooth 165 engages between the teeth of the pinion 146, so that the unit 143 is now connected to the pinion 146 and with the shaft 144 which is continuously rotated by the motor 24. The pinion 146 is fixed with the main shaft 144, while the cams 166, 167 are fixed to one another and are rotatably mounted on the main shaft 144.

Figure 7:
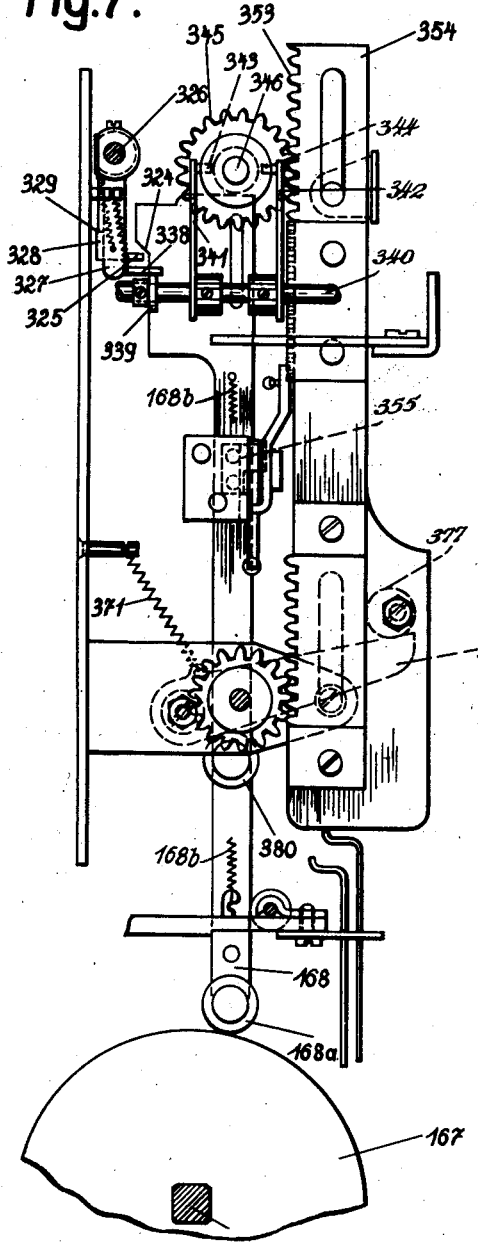
Figure 8:
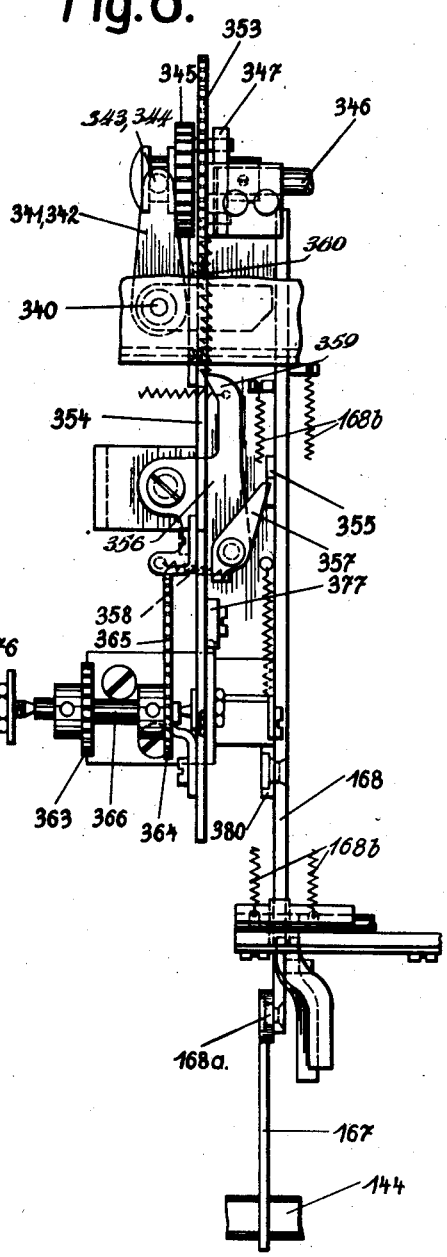

Now the cams 166, 167 participate in the rotational movement of the main shaft 144. The cam 167 influences an unlocking slide 168 (Figs. 6, 7, 8), the lower end of which is provided with a roll 168a guided on the cam 167. The roll 168a is permanently pressed against the cam 167 by two springs 168b which act upon the unlocking slide. As the reduced periphery of the cam 167 is presented to the roll 168a, the unlocking slide 168 moves downwards and acts with its incline 324, (Fig. 7), upon the controlling flap 325 of the lever 327 mounted on the shaft 326 (Figs. 5, 6, 9, 10) and rocks the lever 327 clockwise. The lever 327 lying against the lug 328 of the lever 329 which is rigidly mounted on the shaft 326 participates in the rocking movement of the lever 329, whereby the differential mechanism and through the intermediary of the unlocking lever 330 and the member 331 the totalizers are unlocked. The effected rocking movement of the shaft 326 is transmitted to the unlocking lever 335 by means of the parts 332, 333, 334, 52 constituting a removable crank, whereby by means of the member 336 the cross footer 12 and by means of a further finger the cross footer 13 are unlocked.

*The preparation for total taking from the cross totalizer 13 by depression of the total-taking key 23*

The total-taking key 23 for the cross totalizer 13 is arranged on its total-taking key bar 147 (Fig. 3) at the right-hand side of the machine in the immediate vicinity of the total-taking key 22 for the cross totalizer 12. The key bar 147 which, as mentioned, is mounted to swing on the rod 90, is equipped with a stepped extension 149 which a spring 148 holds against the rear side of the locking bar 94. A locking lever 150 which is similar to the locking lever 95 of the key bar 91, is fulcrumed on the key bar 147 at the left to swing about a screw 151, but is held against lateral displacement. This locking lever has a depending, hooked extension 150b held by a spring connection 150a between the key bar 147 and the locking lever 150 against the front side of the locking bar, thus defining the initial position of the cross totalizer key bar 147.

When the total-taking key 23 is depressed, the key bar 147 is turned about the rod 90 clockwise, like the key bar 91 of the key 22, and the key bar 147 acts on a second push rod 153 with its tail end 152. The upper end of the rod 153 is guided in another slot 107a in the angular guide 105 (Fig. 4) and acts against a lug 60a on the horizontal arm of the second bellcrank 60 described heretofore in the section "The zero stop mechanism for the cross totalizer 13" whereby the tooth 82a on the zero stop 82 of the flap 74 is moved towards the path of the zero setting teeth 163b of the zero setting wheel 163a in the cross totalizer 13.

The second push rod 153 is slotted at its lower end and is guided by the screw 103, as described for the first push rod 101, and its descent by gravity is limited by the slot. By these means, the second push rod 153 is guided at its lower end and its upper end is guided by the slot 107a in the angular bracket 105 which, it will be remembered, is secured to the casing 9 of the calculating mechanism by the screws 106.

When the key 23 is depressed and its key bar 147 is turned clockwise about the rod 90 (Fig. 3), a lug 150c on its locking lever 150 engages below the tail end 109 of the extension 110 at the right-hand end of the double-armed lever 111. The lever is now turned anti-clockwise about its fulcrum screw 112. The locking lever 150 partakes in the downward movement of the key bar 147 and the spring 150a pulls the extension 150b of the locking lever 150 into the groove 126 in the locking bar 94, so that the locking lever 150 and the total-taking key bar 147 are held in depressed position. At the same time, the shoulder 147a of the key bar 147 engages the pin 130 at the outer end of the double-armed lever 129 and causes operation of the lever 134 and 138, and coupling of the unit 143 with the shaft 144. Now, the calculating mechanism, the totalizers are unlocked as described.

*The operation upon depression of the cross-totalizer total-taking key 22*

When the cross-totalizer total-taking key 22 is depressed, the tail end 108 (Fig. 3) of its locking lever 95 engages below the tail end 109 of the double-armed lever 111 and the lever is turned about its fulcrum screw 112 in anticlockwise direction. This swinging movement is transmitted to the other double-armed lever 116 through the pin-and-slot connection 114, 115, and this lever is turned clockwise about its fulcrum screw 117. The lug 118 at the tail end of the double-armed lever 116 moves upwards and engages a fork-shaped member 155 at the lower end of a link 156 under slight pressure.

At its upper end, the link 156, (Fig. 2), is pivoted to the free end of an arm 157 by a screw 157a, whose other end is mounted to swing about a screw 158 in the front wall 319 of the casing 9 of the calculating mechanism (Fig. 2). A pawl 159 with an incline 160 at its free end, is fulcrumed on the arm 157 and a spring 161 is attached to the pawl at one end and anchored in an eye of the arm 157 at its other end. The pawl 159 therefore tends to bear against a check 162 on the arm 157. A spring 173 which is connected to a hook 171 at the free end of the arm 157 at one end and anchored on a pin 172 which is riveted into the front wall 319 of the casing 9, at the other end, pulls the arm 157 in upward direction together with the link 156 connected to it. The upward movement of the arm 157 is limited by its upper edge 174 engaging the end 175 (Figs. 2 and 11) of a slot 177b in an angle bracket 177 which is secured to the front wall 319 of the casing 9 of the calculating mechanism by screws 176.

When the cross-totalizer total-taking key bar 91 (Fig. 3) is depressed, it operates the rod 101 which in turn operates the bellcrank 26 (Fig. 4). The bellcrank 26 to which the rod 28 is pivotally connected, moves the arm 31 in the same direction and the slide 35 is moved in the direction of the arrow 163x as far as permitted, i. e., until the left-hand end of its slot 36 engages the shank of the screw 37. The incline 59 of the slide 35 raises the arm 42 of the flap 41 and turns the flap clockwise. In this way, the tooth 51a of the zero stop 51 on the flap 41 is moved into the path of the zero setting teeth 163b of the zero setting wheel 163 in the cross totalizer 12 which has previously been moved into typewriting and calculating position by tabulation.

At the same time as these movements are started, the cross totalizer total taking key bar 91 acts, with its shoulder 127, on the pin 130 at the outer end of the double-armed lever 129 and turns the lever clockwise. This, through the pin-and-slot connection 132, 133, causes turning of the double-armed lever 134 in the opposite direction, and the lug 136 at the outer end of the lever 134 engages the plate 137 of the double-armed lever 138, so that the tail end 141 of lever 138 releases the coupling member 142 of the cam unit 143. The member is now free to move under the action of its spring 164, and its tooth 165 engages the associated pinion 146, so that now the unit 143 rotates with the continuously rotating shaft 144. The cams 166 and 167 of the element 143 now rotate and the descending portion of the cam 167 moves below the roller 168a at the lower end of the unlocking slide 168 which is under the action of springs 168b. The calculating mechanism and the cross totalizer 12 are now unlocked through mechanism described above.

As the cross totalizer 12 is unlocked, the shaft 52 rotates in the direction of the arrow 169 in Fig. 4 so that its arm 54 moves the rod 55 to the rear, and the incline 58 of the rod raises the slide 35 from its pin 38. The end 43 of the slide, through the arm 42 of the flap 41, moves the tooth 51a of the zero stop 51 finally into mesh with the zero setting wheel 163 of the cross totalizer 12.

Figure 6:
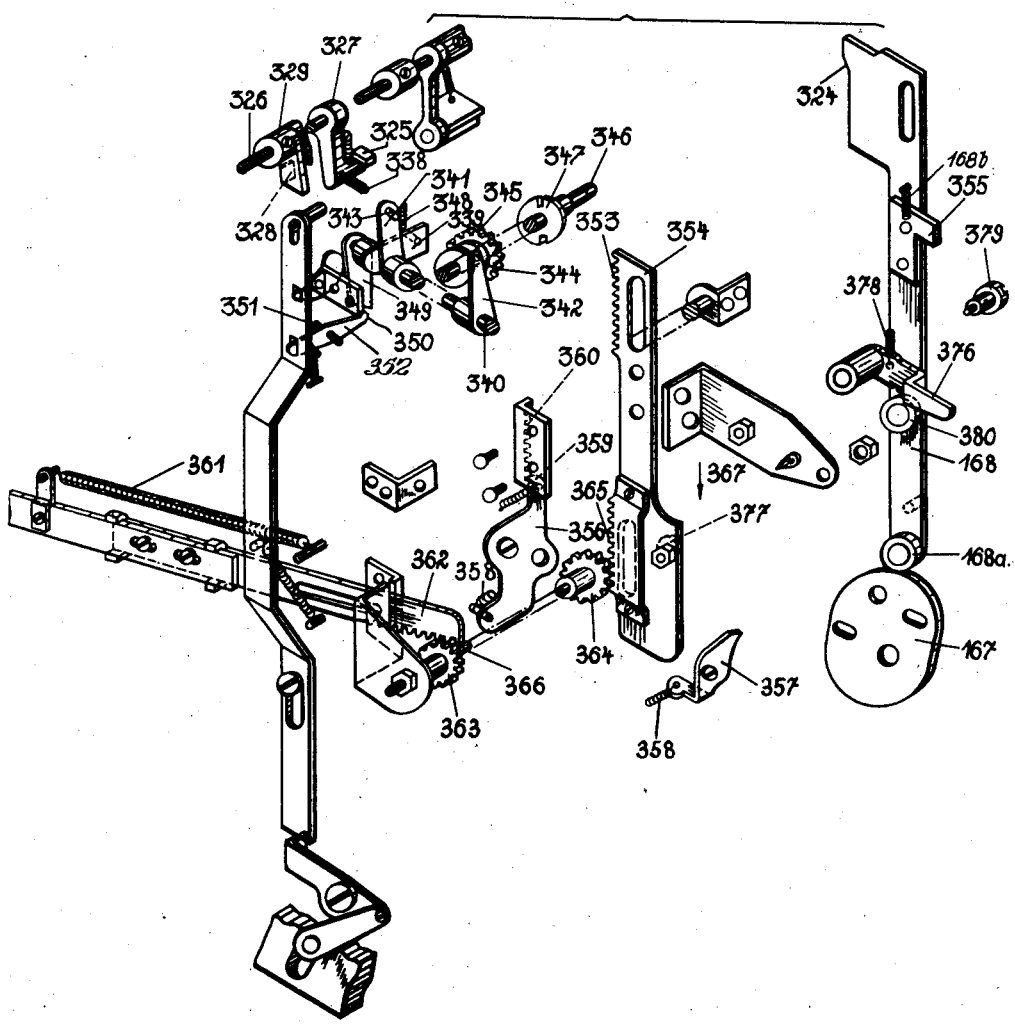

In the rocking movement of the shaft 326, (Fig. 7), a tappet 338 arranged on the lever 327 acts upon the upper edge of a lever 339, which is mounted on the shaft 340 journaled in the rear wall 310 and front wall 319 of the casing of the differential mechanism. On this shaft 340 are arranged the levers 341, 342. The studs 343, 344, riveted into the levers 341, 342 fit in the coupling sleeve of a gear 345, which is mounted on the shaft 346 and slidably guided with the shaft 346. The tappet 338 of the lever 327 influences the shaft 340 in the clockwise direction against the action of the spring 348 (Fig. 6). A further lever 349 fixedly arranged on the shaft 340 is thus caused to press its tooth-shaped edge upon the tooth 350 of the detent lever 352 mounted on a shaft 351, whereby the lever 349 is locked by means of the tooth 350. Rocking the shaft 340 rocks the levers 341, 342 which shift the gear 345 axially along its shaft 346 into engagement with the rack teeth 353 of the zero-setting slide 354 vertically guided at the left side of the casing of the differential mechanism.

As the unlocking slide 168 moves farther downwards it positions its lug 355, (Fig. 8), in operative relation to a pawl 357 pivoted on a locking lever 356 which follows the movement of the unlocking slide 168. The locking lever 356 against which the tail of the pawl 357 contacts participates in the movement of the pawl 357, whereby the locking lever 356 is rocked against the action of a spring 358. Hereby the locking lever 356 normally standing with its locking tooth 359 in engagement with the ratchet teeth 360 of the zero-setting slide 354 is disengaged from the zero-setting slide 354. The released zero setting slide 354 is now driven in the direction of the arrow 367, (Fig. 6), by means of the driving parts 363, 364, 366 actuated by a rack bar 362 against the tension of a spring 361. Consequently the zero-setting-slide 354 moves downwards, and rotates the gear 345 and the shaft 346 clockwise. This rotational movement of the shaft 346 is transmitted by means of the driving parts 368, 369, 370 (Fig. 5) to the shaft 371 and the column register master wheel 372, whereby the master wheel 372 is rotated in anti-clockwise direction. In this rotational movement the column register master wheel 372 acts upon the driving parts of that place of the totalizer which is standing in working position. Furthermore, the shaft 375 carrying the cross totalizer master wheels 301, 302 for the cross-footers 12, 13 is driven by the wheel 374 according to the position of the coupling sleeve 315 and upon rotation of the shaft 346 and the wheel 373 which is fixed on the shaft 346. As soon as a zero-setting tooth 163b, (Fig. 4), of the zero-setting wheels 163, 163a contacts the zero-setting-tooth 51a, 82a, the denominational wheel of the cross footer 12 standing in working position is at zero. At the start of the downward movement of the zero-setting slide 354 the lever 376 is influenced through the eccentric disc 377, whereby the lever 376 is rocked around the screw 379 against the action of the spring 378 in the clockwise direction. As to this movement, the lever 376 is released from the abutment 380 at the beginning of the downward movement of the unlocking slide 354. After the unlocking slide 168 during its farther downward movement, is moved with its abutment nose 355 along the pawl 357, the pawls 357 and 356 return to their normal rest positions under the action of the spring 358. Hereby the locking pawl 356 comes in engagement with the locking tooth 360 which lies in the path of the locking pawl 356 at the end of the downward movement of the zero-setting slide 354, by which farther downward movement of the zero-setting slide 354 is prevented.

*The operation upon depression of the cross-totalizer total-taking key 23*

When the cross-totalizer total-taking key 23 on the key bar 147 is depressed (Fig. 3), the tail end 150c of its locking lever 150 bears against the tail end 109 of the double-armed lever 111 and this is now turned anti-clockwise about its fulcrum screw 112. Through the pin-and-slot connection 114, 115 the double-armed lever 116 is turned clockwise about its fulcrum screw 117. The lip 118 at the tail end of the lever 116 now moves upwards and into light engagement with the fork-shaped lower end 155 of the link 156. At the same time, upon depression of the cross-totalizer total-taking key 23 the tail end 152 of its total-taking key bar 147 raises the second push rod 153 whose upper end 154, (Fig. 4), through the lug 60a, turns the bellcrank 60 clockwise. Through the members 63, 65, 69, 75 and 82 connected to the bellcrank 60, as shown in Fig. 4, a similar operation is performed as described for the bellcrank 26 above in the section "The operation upon depression of the cross-totalizer total taking key 22" whereby the tooth 82a of the zero stop 82 on the flap 74 is moved towards the path of the zero setting teeth 163b of the zero setting wheel 163a.

Simultaneously with the starting of the key 23, (Fig. 3), the shoulder 147a of the cross-totalizer total-taking key bar 147 depresses the pin 130 at the outer end of the double-armed lever 129 and turns the lever clockwise. The coupling member 142 is now released by the tail end 141 of the double-armed lever 138, and the spring 164 of the member connects the cam element 143 to the shaft 144. The lowermost portion of the cam plate 167 is now below the roller 168a of the unlocking slide 168, with its springs 168b. By these means, through the mechanism described above, the calculating mechanism and the totalizers are unlocked. The shaft 52 which, under control of the unlocking slide 168, turns in the direction of the arrow 169 in Fig. 4, turns its arm 83 and pushes the rod 86 to the rear. The rod, by its incline 88, raises the slide 69 from its pin 72, and the end 76 of the slide turns the arm 75 of the flap 74 and thus moves the tooth 82a of the zero stop 82 on the flap 74 finally into the path of the zero setting teeth 163b of the zero setting wheel 163a in the cross totalizer 13. Thereafter, the same operations as described above in the section "The operation upon depression of the cross totalizer total taking key 22" of the unlocking slide 168 and the zero setting slide 354 take place.

The total taking from the cross totalizer 12

The value "27" which has been calculated in the cross totalizer 12 is now withdrawn by the automatic total taking operation and printed in the column V of the form 25 (Fig. 17). At the same time, the value "27" must be subtracted from the value "190" in the cross totalizer 13, and introduced into the column totalizer 7.

In order to be able to write clear the cross totalizer 12, the column totalizer 7 which controls the cross totalizer 12 must be moved into the actuating position required in conformity with the value "27" by depressing the corresponding key of the decimal tabulator 20. The carriage is now released and moved to the left, whereby the column totalizer 7, through its hook 7a (Fig. 1) and the connecting rod 14, moves the cross totalizers 12 and 13 to the left. Hereby the control plate 381a of the totalizer 7 acts upon the lever 382 and rocks the same in the clockwise direction, by which the reversing gear controlling the kind of calculation is shifted to subtraction through the parts 383, 384, 385, 386, 387, because the value standing in the cross totalizer is a positive value. Thereby the tooth wheel 373 is connected with the master wheel driving shaft 375 by means of the wheels 388, 389. Furthermore the coupling sleeve 314 is shifted during the carriage movement by the control plate 320 of the column totalizer so that the master wheels 381, 382 of both cross totalizers 12 and 13 are driven. The drive of the wheels occurs in subtractive sense for both cross totalizers in view of the above adjustment of the species.

An angular unlocking member 179 whose vertical flange is slotted for the reception of a clamping screw 178 (Figs. 1, 11 and 12) is attached to the column totalizer 7. The front plate of each column totalizer is slotted at 204a for the reception of a croze 204 on the vertical flange of the corresponding angular member, for holding the member in the proper position. If desired, several crozes may be arranged on the members so that they can be fixed to the column totalizers in various positions. All column totalizers are provided with the means 178 and 204a for the reception of an angular member but in the present instance only the column totalizer 7 is so equipped.

When the column totalizer 7 moves into calculating position, the horizontal flange 179a whose lower surface is designated by the numeral 205, acts on a roller 180 of an unlocking arm 181 whose fork-shaped right hand end is mounted to swing about the screw 158 of the arm 157. The arm is turned anti-clockwise against the action of a spring 182 whose one end engages a hook 181a on the free end of the arm 181 and whose other end is secured to a pin 181b arranged at the front wall 319 of the casing 9 of the calculating mechanism. The arm 181 is guided in a second slot 177a in the bracket 177, and the upper limit of its movement is defined by the upper end of the slot.

A connecting rod 186 is pivotally connected to the unlocking arm 181 at 183 by means of a screw at its upper end and its lower end is connected at 184 to one arm of a locking lever 185 fulcrumed on a pin 187 screwed into the left-hand side wall of the machine frame 1 (Fig. 1). The forward arm 188 of the lever 185 projects through a slot 189 (Fig. 1) in the key-bar guide 190 and is offset for cooperation with a cam 192 at the left-hand end of a U-shaped locking bar 193.

The locking bar 193 is mounted to slide on the front transverse rib of the bearing frame 18 by a pair of headed screws 194 inserted in the rib and extending through longitudinal slots 195 in the locking bar. A spring 196 pulls the locking bar to the right as far as permitted by the left-hand ends of its slots 195. At its right-hand end, the locking bar has a pair of lugs 193a and 198, with a gap 197 between them.

In the initial position of the locking bar 193, as shown in Fig. 1, the key bar 91 of the cross totalizer total-taking key 22 is locked by the upper edge 201 of the lug 193a, and the key bar 147 of the other cross totalizer total-taking key 23 is free to move in the gap 197 between the two lugs.

When the unlocking arm 181 is turned anti-clockwise by engagement of the horizontal flange 179a of the angular member 179 with the roller 180, the connecting rod 186 is lowered and the locking lever 185 is turned clockwise. The crooked end 191 of its arm 188 wipes along the cam 192 at the left of the locking bar 193 and shifts the bar to the left against the action of its spring 196. The upper edge 201 of the lug 193a which, in the normal position of the bar, prevents depression of the cross totalizer total-taking key 22 by lying in the path of its key bar 91, now clears the key bar which is free to move in the recess 197 while the lug 198 of the locking bar 193 moves below the key bar 147 of the other cross totalizer total-taking key 23 and locks the key 23.

The total-taking key 22 of the cross totalizer 12 is now depressed and total taking occurs automatically, as described above in the section "The operation upon depression of the cross-totalizer total-taking key 22." The value "27" in the cross-totalizer 12 is withdrawn from the totalizer and printed in column V, line 1 of the form 25, Fig. 17. At the same time, the value "27" is subtracted from the value "190" in the cross totalizer 13 and is entered in the column totalizer 7. The cross totalizer 12 is now at zero, and the value "163" is in the cross totalizer 13. As soon as the value to be introduced in the units place of the column totalizer 7, has been thus introduced, the step of the carriage to sub-units position which is caused thereby, moves the flange 179a of the unlocking member 179 on the column totalizer 7 away from the roller 180 of the unlocking arm 181, and the spring 182 now moves the arm into its normal position in clockwise direction, Fig. 1, in which position the end 191 of the arm 188 lies just below the cam 192, the lever 185 having been turned anti-clockwise about its fulcrum 187 by the ascending connecting rod 186. As the offset end 191 of the arm 188 escapes from the cam 192 of the locking bar 193, the bar is returned into its normal position, as shown in Fig. 1, by its spring 196, as defined by the left-hand ends of the longitudinal slots 195 engaging the guide screws 194.

When the carriage performs the step to sub-units position during this automatic clear writing of the totalizer 12, a lug 199 at the right-hand side of the bottom plate 200 with which the totalizer 7—like all other column totalizers—is equipped, as shown in Figs. 1 and 2, engages the incline 160 (Fig. 2) at the free end of the pawl 159 on the arm 157 to turn the arm about its fulcrum 158 anti-clockwise against the spring 173, and force the link 156 downwardly. The lower forked end 155 of the link presses downwardly the lip 118 (Fig. 3) at the tail end of the double-armed lever 116. This lever is now turned anti-clockwise about its fulcrum screw 117 and the double-armed lever 111 is turned clockwise by the pin-and-slot connection 114, 115. The tail end 109 of the double-armed lever 111 depresses the tail end 108 of the locking lever 95 on the key bar 91 of the key 22, turning the lever anti-clockwise about the screw 96 so that the extension 98 of the locking lever 95 leaves the groove 126 in the locking bar 94 and the key bar 91 and the locking lever 95 return into initial position.

The cross totalizer total taking key 22, on its return to its normal position, withdraws the shoulder 127 of the key bar 91 from the pin 130 at the right-hand end of the double-armed lever 129 so that now the spring 140 of the double-armed-lever 138 is free to turn the double-armed lever 134 through the plate 137 and the lug 136, and the double-armed lever 129 through the pin-and-slot connection 132, 133. The tail end 141 of the double-armed lever 138 which turns anti-clockwise about the rod 90, again engages the coupling member 142 142 by its end 141a. This occurs at the end of the last rotation of the element 143, with its cam plates 166 and 167 and the coupling member 142 strikes the tail end 141 of the double-armed lever 138, so that the coupling member 142 is disengaged from the pinion 146 against the action of the spring 164, and the cam plate element ceases to rotate.

*The total taking from the cross totalizer 13*

The value "163", which has been calculated in the cross totalizer 13 must now be withdrawn by automatic total taking, and typed in the column VI of the form 25, Fig. 17. The value is not introduced into the column totalizer 3 since this, as mentioned, is a dummy.

For taking the total from the cross totalizer 13, the dummy 8 and the cross totalizer 13 are moved into calculating position in conformity with the value "163" to be typed. By mechanism described in the section "The total taking from the cross totalizer 12" the cross totalizer 13 is set for subtraction since the value "163" to be withdrawn is positive, and, when the dummy 8 moves into active position the coupling sleeve 314 described in the section "The drive of the cross footers 12 and 13" is connected only to the driving wheel 302 of the cross totalizer 13.

Figure 11:
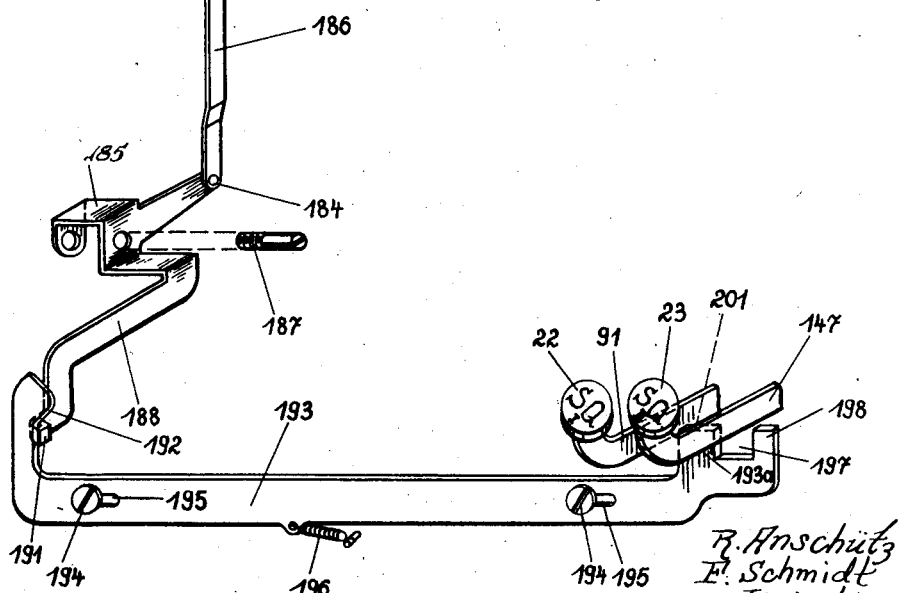

Since the dummy 8 is without an angular member 179 this column totalizer cannot cooperate with the roller 180 on the unlocking arm 181, and so the connecting rod 186, the lever 185, and the end 191 of its arm 188 remain in the initial positions shown in Fig. 11 in which the key bar 147 of the total taking key 23 controlling the cross totalizer 13, is free to move in the recess 197 of the locking bar 193, Fig. 1, while the key bar 91 of the total taking key 22 controlling the cross totalizer 12, is locked by the lug 193a, 201.

The cross totalizer total taking key 23 is now depressed, to begin the automatic clear writing of the corresponding cross totalizer 13. When the carriage feeds the dummy totalizer 8 to its sub-units position during this automatic clear writing of the cross totalizer 13, the lug 199 of the dummy 8 acts on the pawl 159 of the arm 157, Figs. 1 and 2, and the arm 157 is turned anti-clockwise against the action of its spring 173 about its fulcrum 158 so that the forked lower end 155 of the tip 156, the lip 118, the double-armed lever 116, the pin-and-slot connection 114, 115, the double armed lever 111 and its tail end 109 cooperate to depress the tail end 150c of the locking lever 150 on the key bar 147. The locking lever 150 is turned anti-clockwise about its fulcrum screw 151 and its extension 150b leaves the groove 126 in the locking bar 94, whereupon the locking lever 150 and the key bar 147 of the key 23 return into initial positions. In so doing, the shoulder 147a of the cross totalizer total-taking key bar 147 releases the pin 130 at the right-hand end of the double-armed lever 129, and the tail end 141 of the double-armed lever 138 is allowed to return again into the path of the coupling member 142 by the cooperation of the double-armed lever 129, the pin-and-slot connection 132, 133, the double-armed lever 134, its lug 136, the plate 137 of the double-armed lever 138, and the spring 140 connected to the lever 138. At the end of the rotation of the unit 143, with its cam plates 166 and 167, consequently, the end 141a of the coupling member 142 strikes the tail end 141 of the double-armed lever 138 and the coupling member is disengaged from the pinion 146 against the spring 164, and the cam plate element 143 ceases to rotate.

The total taking is completed with the printing of the value "3" in the units place in the first line, column VI of the form 25. All parts partaking in the operation are now returned into their respective initial positions in the manner described.

When the entries have been performed in the manner described, for instance, in the first two lines of the columns I to VI of the form 25, the amounts in columns II to V, inclusive, of the form 25 which have been added in the column totalizers 4 to 7, inclusive, are written out in the third line of the form 25 in the manner described below in the section "Total taking from the totalizers" whereupon the entry on the section of the form illustrated in Fig. 17 is finished. When writing out the values from the column totalizers 4 to 7, inclusive, the cross totalizers 12 and 13 must be moved to the left-hand end of their movement, and there locked by the member 202 (Fig. 1) so that no values can get into the cross totalizers 12 and 13 which have already been set to zero.

When all totalizers have been clearwritten and it is desired to perform a fresh booking operation, the paper carriage must first be moved to its extreme position at the right by depressing the carriage return key 17. The column totalizers move to the right with the carriage, their lugs 199 acting on the pawl 159 on the arm 157, Fig. 2, and turning the pawl clockwise about its fulcrum against the action of the spring 161, without any parts being influenced. The angular members 179 of those column totalizers which are equipped with such, engage the roller 180 on the arm 181, turning the arm about the screw 158 against its spring 182 and causing the locking bar 193 to move to the left under the action of the connecting rod 186, and the off-set end 191 of the lever 185 but this movement of the locking bar does not have any function.

Since the zero stops 51 and 82 (Fig. 4) each have an independent control, it is possible at any time to operate the two cross totalizers 12 and 13 in the manner of a complementary totalizer. Obviously, in this case the sequence of the figures on the wheels of the cross totalizers 13 must be the reverse of the sequence in the cross totalizer 12.

Total taking from the totalizers

First of all the totalizer is brought in calculating position by means of the decimal tabulator key 20 corresponding to the value to be written out from the totalizer. Through the carriage movement in the left hand direction the control plate 379 (Figs. 9, 10) of the corresponding totalizing acts upon the controlling lever 390a and unlocks the unlocking lever 381 (Fig. 10) arranged on the shaft 326 of the differential mechanism.

Now the key 21 (Fig. 3) is depressed, whereby the lever 139 is rocked around the shaft 90 and the slide 390 (Fig. 10) is moved upwards against its spring 391. Consequently the angle lever 392 is rocked around the bearing screw 393 in the clockwise direction, which movement by means of the fork-connection is transmitted to the slide 396 which with the inclined surface 397 of its nose 398 acts upon the zero-setting abutment 399 and rocks the same with the supporting rocker 400 (Fig. 10) against the action of the spring 401 in counter-clockwise direction. The zero-setting abutment 399 is thus set in a preparatory position to the zero-setting wheels 402 (Fig. 9) of the totalizer. In the rocking movement of the column register total taking key lever 139 the arm 141 of the trip lever 139 releases the coupling pawl 142, so that the coupling pawl 142 may be brought in engagement to the coupling wheel 146 under the action of its spring 164. Consequently the cams 166, 167 are coupled to the shaft 144 continuously driven by the motor. Thereupon, the unlocking slide 168 as well as the zero setting slide 354 are operated as described under the heading "Preparation of the total taking operation on depression of the key 22." In the operation of the unlocking slide 168 the shaft 326 receives a rocking movement as described under the heading "Preparation of the total taking operation on depression of the key 22" in which rocking movement the lever 403, (Fig. 10), participates because it is fastened on the shaft 326. In the rocking movement of the lever 403 the beveled end 405 of the lever 404 is pushed forwardly, whereby the slide 396 is rocked around the screw 397 in counter-clockwise direction. Consequently the zero-setting abutment 399 is given an additional increment of movement to finally lie in operative position to the zero-setting wheels 402 of the totalizers and the typing is accomplished as described under the heading "Total taking for the cross-totalizer 12."

A modified locking bar

Referring now to Figs. 14, 15 and 16, this locking bar is distinguished from the locking bar illustrated in Figs. 1 and 11, in that it is arranged for locking and unlocking not only the cross-totalizer total-taking keys 22 and 23, but also the column totalizer total-taking key 21, with its key bar 139.

To this end, the upwardly extending arm at the left-hand end of the key locking bar 193—which is guided by the screws 194 and the slots 195—is recessed to form a step 206 for locking the column-totalizer key 21. as shown in Fig. 16. At the right-hand end of the locking bar, three lugs 208, 209 and 207 are arranged. A gap 193x is formed between the lugs 208 and 209, and another and wider gap 197x is formed between the lugs 209 and 207, this being the gap 197 already described.

When it is desired not to take a total from one of the column totalizers 3 to 8, for instance, from the column totalizer 8 which is a dummy and from which no total must be taken when it is in calculating position, as in this case the figure "9" would be printed on the form 25—it is only necessary to equip such column totalizer or dummy with the angular member 203 illustrated in Fig. 13. This member which is secured to the front plate of the corresponding totalizer by the screw 178, and equipped with the croze 204, is distinguished from the member 179 illustrated in Figs. 1 and 12 in that the distance $a$ from the croze 204 to the lower face 205 of the horizontal flange 179a with which the member acts on the roller 180 of the arm 181, is greater than the corresponding distance $b$ in the member 179, Fig. 12. Consequently, the member 203 imparts a longer stroke to the arm 181 than the member 179 when it acts on its roller 180. The corresponding swinging movement of the arm 181 is transmitted to the arm 188 of the lever 185 (Fig. 11) through the connecting rod 186, and the locking bar 193 is shifted.

In its initial position, Fig. 14, as defined by the screws 194 and the left-hand ends of the slots 195 which are pulled against the screws by the spring 196, the step 206 at the left-hand end of the locking bar 193 clears the column-totalizer total-taking bar 139 of the key 21 and the lug 207 at the right-hand end of the bar clears the cross totalizer total-taking bar 147 of the key 23, so that the keys 21 and 23 can be depressed. However, the lug 208 locks the cross-totalizer total-taking key bar 91 of the key 22, and this key cannot be depressed.

When that column totalizer or dummy from which no total must be taken, moves into calculating position, its angular member 203, through roller 180, arm 181, rod 186, lever 185, and arm 188, as shown in Fig. 11 causes the locking bar 193 to move into its left-hand position, Fig. 16. In this position, the keys 21, 22, 23 are locked against depression, respectively, by the step 206 and the lugs 209 and 207. When the angular member 203 releases the roller 180 of the arm 181, the spring 182 returns the lever 185 to its normal position, as shown in Fig. 11, and the spring 196 returns the locking bar 193 into the initial or normal position, Fig. 14.

Fig. 15 shows the position into which the locking bar is moved when the arm 181 is controlled by an angular member 179, with its shorter pitch b, Fig. 12. The locking bar is shifted to the left for a shorter distance than in Fig. 16, and so the step 206 does not move into locking position with respect to the bar 139 of the column totalizer total-taking key 21, and the gap 193x is in line with the bar 91 of the cross totalizer total taking key 22, but the bar 147 of the cross-totalizer total-taking key 23 is locked by the lug 207. The keys 21 and 22 can now be depressed. When the angular member 179 releases the roller 180, the arm 181, the connecting rod 186, and the lever 185 are returned into their normal positions, as shown in Fig. 11, and the spring 196 returns the locking bar 193 into its normal position, Fig. 14.

*A total taking mechanism for a machine having three cross totalizers*

Referring now to Figs. 18 to 25, it should be noted that for certain booking operations three cross totalizers 12, 13, and 220 are required, as shown in Fig. 18, and nine column totalizers 3 to 11. Totals are alternately and automatically taken in the three cross totalizers, 12, 13 and 220, and transferred to the column totalizers allotted to the cross totalizers.

The mechanisms for the automatic total taking from the two cross totalizers 12 and 13 are similar to those which have been described above with reference to Figs. 1 to 6, and so only the extra mechanism for the automatic total taking from the third cross totalizer 220 will now be described.

The total-taking key 221 for total taking from the third cross totalizer 220 is arranged in the bearing frame 18 between the keys 22 and 23 for the cross totalizers 12 and 13, and its key bar 222 is mounted to swing about but held against lateral displacement on, the rod 90 (Fig. 20) which is secured in the bearing frame 18. A spring 223 holds a step 224 on an extension of the key bar 222 against the rear side of the locking bar 94, which is also secured in the bearing frame 18. A locking lever 225 is fulcrumed at 226 at the left-hand side of the key bar 222 and held against lateral displacement. A spring 227 connecting the locking lever 225 to the key bar 222 pulls an extension 228 of the locking lever 225 against the front side of the locking bar 94 and thus defines the initial position of the locking lever 225 and the key bar 222.

When the third total-taking key 221 is depressed, its key bar swings about the rod 90 in clockwise direction, and the tail end 229 of an off-set portion 230 of the key bar 222 bears against the lower end of a third push rod 231 which is raised in the direction of the arrow 232. The guide screw 193 shown in Fig. 19, and, as described with reference to Figs. 3 and 4, extends through slots at the lower end of the other push rods 101 and 153, being screwed into the machine frame 1, and also extends through a slot 234 of the third push rod 231. Thus, the guide screw not only guides the three push rods 101, 153, and 231, but also limits their descent by gravity. An additional guide for the rod 231 is provided by its upper end sliding in a third slot 235 (Fig. 21) of the bracket 105.

When the key 221 is depressed and its key bar 222 are thereby turned clockwise about the rod 90, the tail end 233 of the locking lever 225 engages below the tail end 109 of the upwardly extending portion of the double-armed lever 111. This lever, and the mechanism connected to it, have already been described with reference to Fig. 3, and are quite similar in the machine according to Figs. 18 to 25.

The movement of the key bar 222 of the third total-taking key 221 upon depression of this key also causes the extension 228 of its locking lever 225 to engage in the groove 126 in the locking bar 94, holding the locking lever 225 and the total-taking key bar 222 in depressed position.

A shoulder 236 on the total-taking key bar 222 acts on the pin 130 which is riveted in the lug 128 of the double-armed lever 129. The lever 129, and the mechanism connected to it, have also been described with reference to Fig. 3, and again are quite similar.

Upon depression of the key 221, the key bar 222 of the total-taking key 221 rocks clockwise against its spring 223, about the rod 90. The locking lever 225 partakes in this movement of the key bar. Its extension 228 slides off the locking bar 94 and, at the end of the swinging movement, is drawn into the groove 126 of the locking bar 94. The key bar 222 and the locking lever 225 are held in active position. The tail end 233 of the locking lever 225 engages, upon the swinging movement, the tail end 109 of the double-armed lever 111 by which it will be operated at the end of the total-taking. The tail end 229 of the arm 230 of the total-taking key bar 222, upon the swinging movement, shifts the push rod 231 upwards. At the same time, the shoulder 236 of the total-taking key bar 222 acts on the pin 130 of the double-armed lever 129 and swings this clockwise about its fulcrum 131. The machine is now started by parts, which are under the control of the double-armed lever 129, as described above in the section "The operation upon depression of the cross totalizer total taking key 22."

*The zero-setting mechanism for the third cross totalizer 220*

A third bellcrank 237, as shown in Figs. 19 and 21, is mounted to swing about the screw 27 which supports the bellcranks 26 and 60 and is secured in a part of the casing 9 of the calculating mechanism. The horizontal arm of the third bellcrank is equipped with a lug at its free end, like the lugs 60a and 145 of the two other bellcranks, which is engaged by the upper end of the ascending push rod 231. To the upwardly directed arm of the third bellcrank 237, one end of a U-shaped rod 239 is pivotally connected at 240, and the other end of the rod is pivotally connected to an arm 242 at 241. The arm 242 which corresponds to the arms 31 and 65 of the mechanism illustrated in Fig. 4, is mounted to swing about a headed screw 243 which is screwed into the rear wall of the casing 9 of the calculating mechanism and its upper forked end 243a engages a pin 244 on a slide 245. The slide 245 is guided by a slot 246 and screw 247 screwed into the rear wall of the casing 9 of the calculating mechanism, so that the slide 245 can reciprocate longitudinally. A further guiding means for the slide is a pin 248 on which the slide 245 rests. A spring 249 engaging the arm 242 turns the arm anti-clockwise about its fulcrum 243 and the slide 245 is pulled to the left. This movement is limited by the right-hand end of the slot 246 in the slide 245 butting against the screw 247, and this is the initial position of the arm 242, the slide 245, and the members connected thereto.

A third zero-setting flap 251 is mounted to swing about, but held against lateral displacement on, the rod 40. An arm 252 extends to the rear from the flap and bears on the beveled end 253 of the slide 245 under the pressure of a spring 254 engaging the arm 252 of the third flap 251, thus holding the arm 252 in operative connection with the end 253, and forcing, at the same time, the slide 245 against the pin 248.

The rod 40 is held in a bracket 255, Fig. 19, similar to the bracket 45 in Fig. 2, and secured to the inner side of the front wall of the casing 319 of the calculating mechanism, by screws 256. The third flap 251 is held against lateral displacement on the rod 40 between a deflection 257 (Fig. 19), of the bracket 255, and an adjustable ring 258 secured on the rod 40.

Secured to the forwardly directed and upwardly deflected portion 259 of the third flap 251 at 260 is a zero setting stop 261 whose tooth 262 is arranged to cooperate with the teeth of the zero-setting wheels 263 of the third cross totalizer 220.

Keyed on the shaft 52 is the boss 264 of an arm 265. A rod 266 is pivotally connected to the arm 265 by a screw 267. The end 268 of the rod 266 engages below the slide 245, and an incline 269 on the rod is arranged to act on the slide 245 when the rod is actuated. The end 268 of the rod 266 is guided in a suitable slot 406 in the rear wall of the casing 9 (Fig. 21) of the calculating mechanism and thus afforded a suitable support. The slide 245 has an incline 270 for cooperation with the arm 252 of the third flap 251.

Further, the cross totalizer total-taking key bar 222 upon depressing of the key 221 raises the push rod 231 which turns the bellcrank 237 in clockwise direction. The rod 239 which is pivotally connected to the bellcrank 237, turns the arm 242 about its fulcrum 243 in the same direction, and the slide 245 is moved to the right until the rounded end of its slot 246 at the left abuts against the shank of the screw 247. While the slide 245 thus moves, its incline 270 turns the arm 252 of the third flap in clockwise direction. In this manner, a tooth 262 on the zero stop 261 which is secured to the third flap 251, is moved partway towards the path of the zero setting teeth 263a of the zero setting wheel 263 in the third cross totalizer 220.

When the cross totalizers 12, 13, and 220 are unlocked, the shaft 52 turns, as described with reference to the first embodiment illustrated in Figs. 1 to 12, the arm 265 secured on the shaft is turned, and the push rod 266 is shifted to the rear. The rod 266, with its incline 269, engages below the slide 245 and raises the slide. The slide turns the arm 252 of the third flap 251 and thus brings the tooth 262 of the zero setting stop 261 finally into the path of the teeth of the zero setting wheel 263 in the third cross totalizer 220.

By mechanism which has been described with the first embodiment, Figs. 1 to 12, the values in the third cross totalizer are now written on a suitable form.

Referring now to Figs. 22, 23, 24 and 25, this locking bar 272 is arranged to slide on the front rib of the bearing frame 18 in the manner described for the locking bar 193. It is similar to the locking bar which has been illustrated in Figs. 14, 15 and 16, with a step 275 for the bar 139 of the key 21 at its left-hand end, and three lugs 276, 277, and 278 at its right-hand end.

Assume that, as shown in Fig. 18, an angular member 179 is secured to the column totalizer 5, an angular member 203 is secured to the column totalizer 8, and an angular member 271 is secured to the column totalizer 9, for controlling the locking bar 272. When the angular members 179, 203, and 271 engage the roller 180 on the arm 181, Fig. 11, the locking bar 272 is so controlled through the arm 181, the connecting rod 186, and the arm 182 of the lever 185, that only one of the total-taking keys 22, 23, and 221 for the respective cross totalizers 12, 13 and 220 can be operated at a time, the stop 275 to 278, inclusive, of the locking bar 273 cooperating with the bars of the keys 21, 22, 23 and 221. The operation of the locking bar 272 will be fully understood from Figs. 22 to 25, without detailed description, as will the mechanisms for the locking bar 193 illustrated in Figs. 14 to 16 inclusive, as their operation has been fully set out in the section "A modified locking bar," and is similar for the locking bar 272. The locking possibilities of the locking bar will be understood from the following table.

*Condition of total-taking keys*

| Angular member present | Total-taking key 21 for column totalizers | Total-taking key 22 for cross totalizer 12 | Total-taking key 23 for cross totalizer 13 | Total-taking key 221 for cross totalizer 220 | Figure |
|---|---|---|---|---|---|
| None | *Free* | Locked | *Free* | Locked | 18, 22 |
| 179 | *Free* | *Free* | Locked | Locked | 23 |
| 203 | *Free* | Locked | Locked | *Free* | 24 |
| 271 | Locked | Locked | Locked | Locked | 25 |

Having now particularly described and ascertained the nature of our said invention, and in what manner the same is to be performed, we declare that what we claim is:

In a power-driven typewriting-accounting machine, the combination with a travelling carriage; a plurality of column totalizers mounted thereon; a plurality of cross totalizers mounted on the frame of the machine; a keyboard having numeral keys; operating means for the totalizers, under control of the numeral keys; a manipulative device located at one side of the keyboard, and common to the several column totalizers to condition the operating means for taking totals automatically from the column totalizers as they are positioned at the computing zone; and manipulative devices individual to the several cross totalizers and grouped at the opposite side of the keyboard, and selectively operable to condition the operating means for taking totals automatically from their associated cross totalizers; of a slidable locking bar extending transversely of and beneath the keyboard from side to side thereof; the locking bar having an arm at each end projecting upwardly into proximity to the manipulative device common to the column totalizers, and to the manipulative devices individual to the cross totalizers, respectively; shoulders formed on the upper ends of the arms and shiftable into and out of locking position with their associated manipulative total taking devices, respectively; a cam formed on one of the upwardly projecting arms; a wiper to co-act with the cam; and carriage-controlled tappets to shift the wiper different distances along the cam to shift the locking bar to one or another of its positions and select which of the manipulative total taking devices individual to the respective cross totalizers shall be operable in predetermined positions of the carriage, or to lock all of the manipulative total taking devices against operation.

ROBERT ANSCHÜTZ.
FRITZ SCHMIDT.